Nov. 19, 1968   J. O. BYERS, JR   3,411,295
HYDRAULIC SUPPLY SYSTEMS
Filed May 31, 1967   12 Sheets-Sheet 1
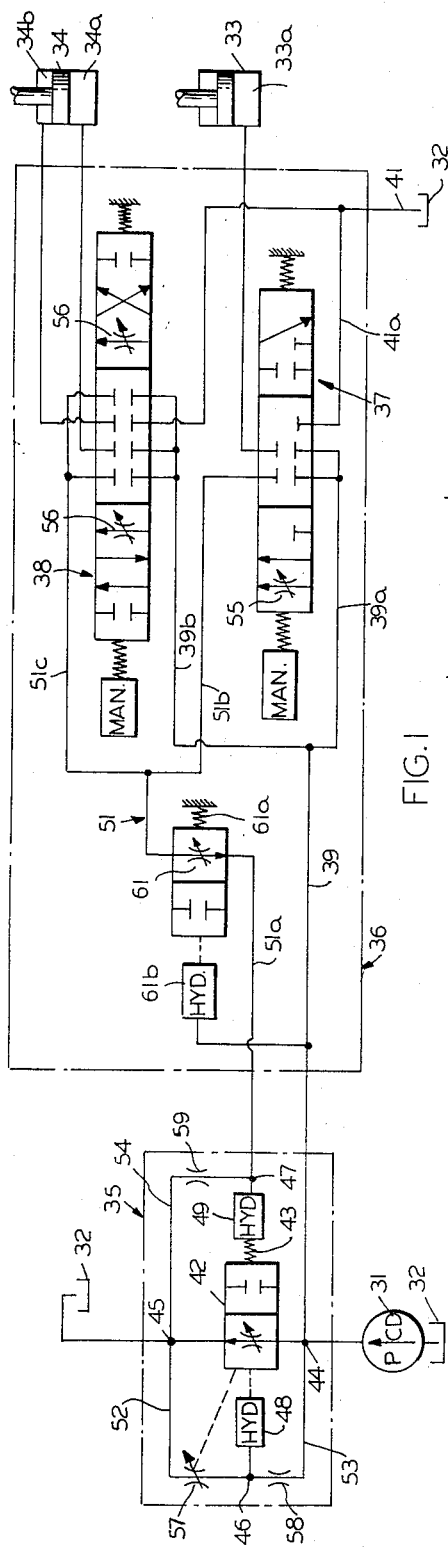
FIG.1
FIG.1A
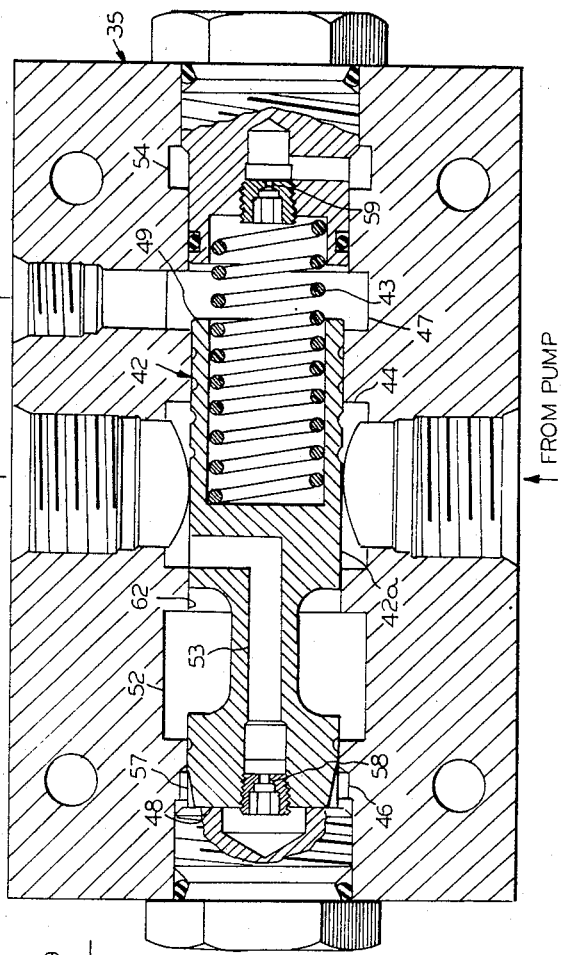
FIG.2
INVENTOR
JAMES O. BYERS, JR.
BY Dodge and Sons
ATTORNEYS

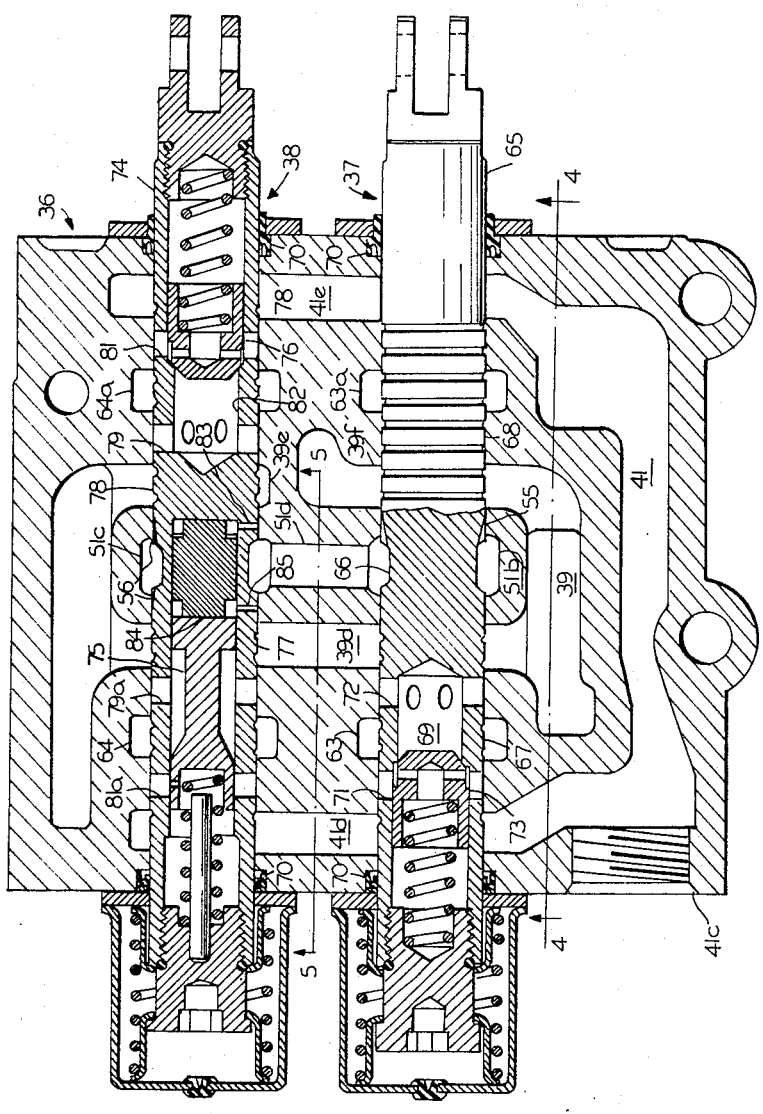

Nov. 19, 1968   J. O. BYERS, JR   3,411,295
HYDRAULIC SUPPLY SYSTEMS
Filed May 31, 1967   12 Sheets-Sheet 3
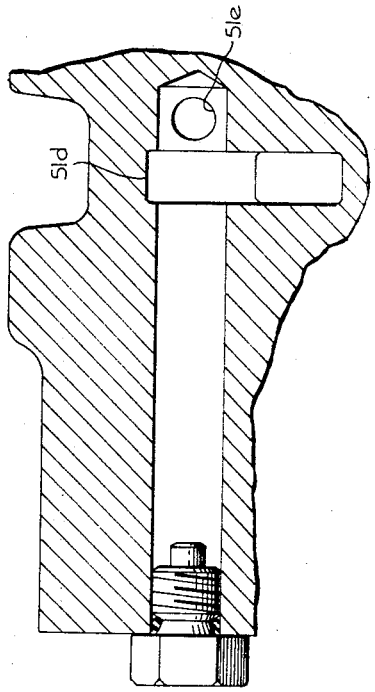
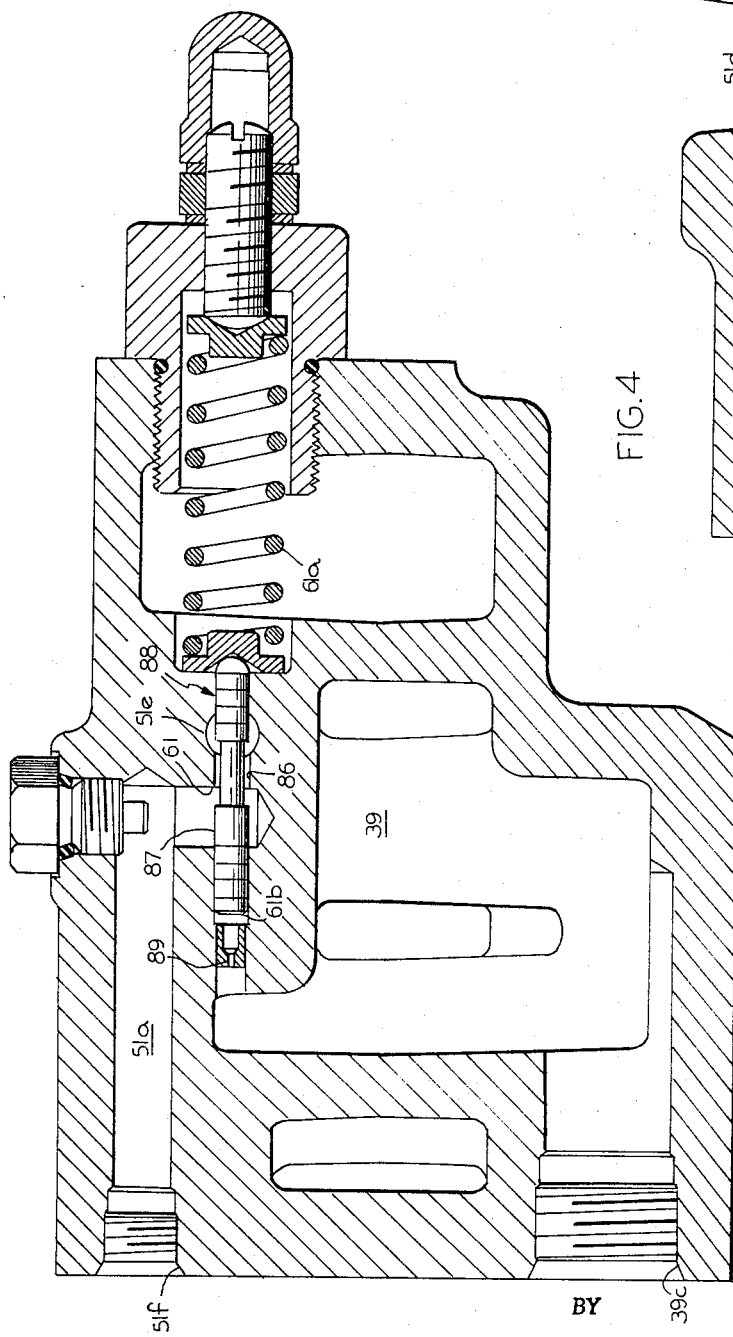
INVENTOR
JAMES O. BYERS, JR.
BY   Dodge and Sons
ATTORNEYS

INVENTOR
JAMES O. BYERS, JR.

BY Dodge and Sons

ATTORNEYS

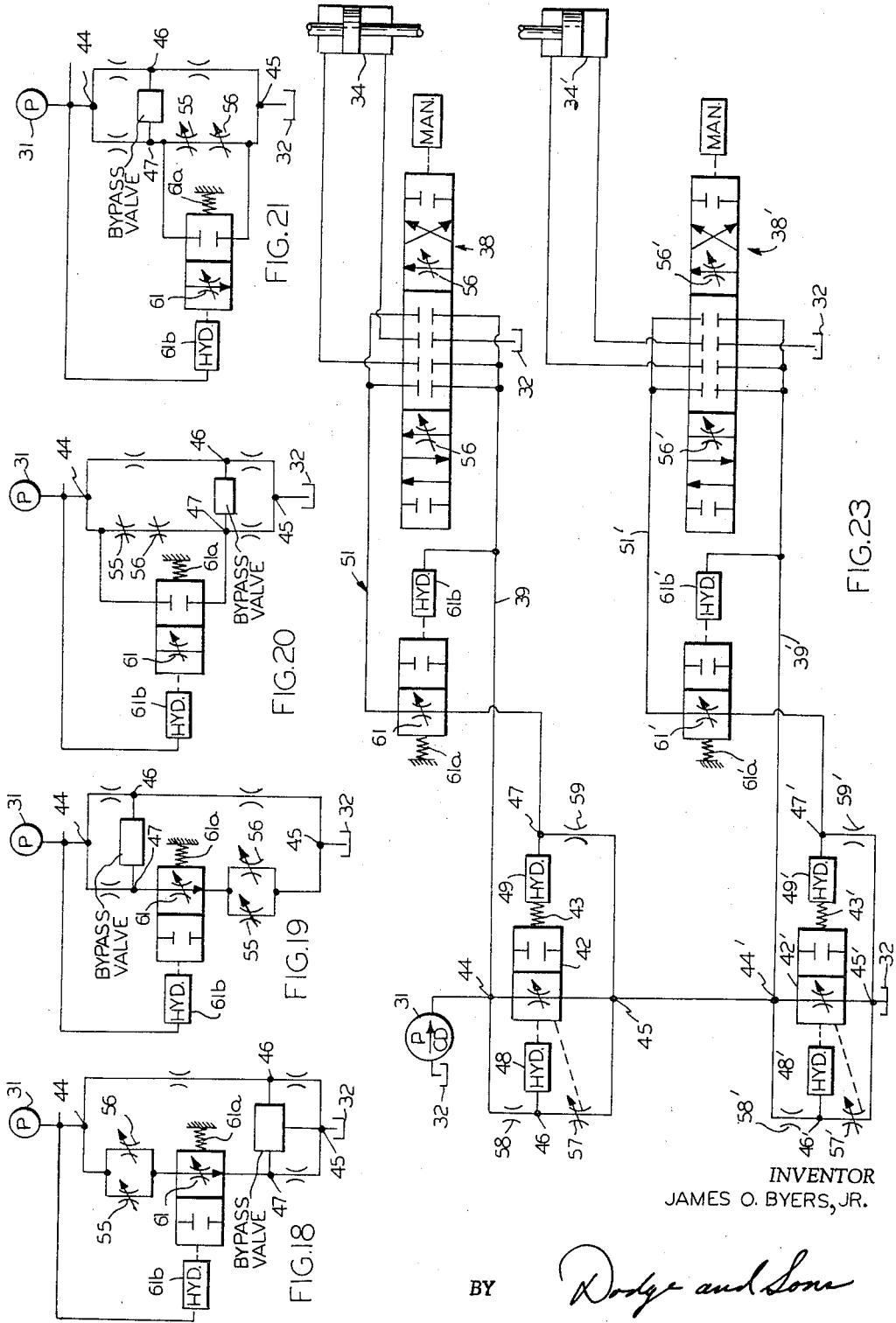

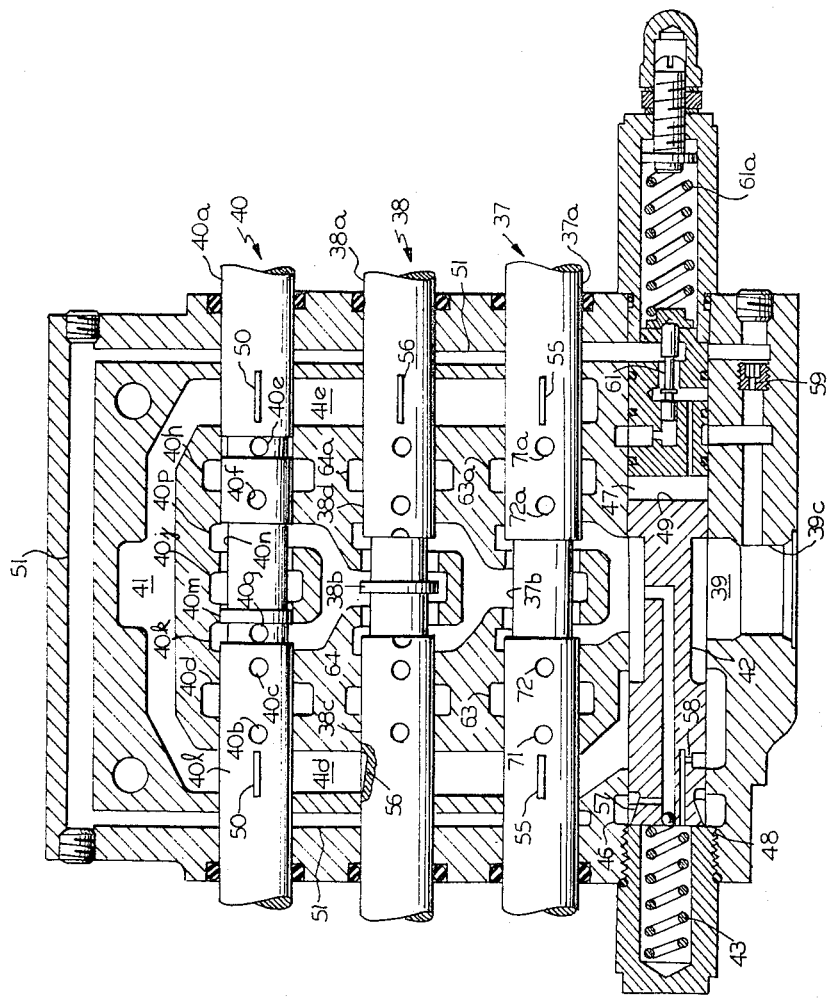

INVENTOR
JAMES O. BYERS, JR.
BY Dodge and Sons
ATTORNEYS

Nov. 19, 1968

J. O. BYERS, JR 3,411,295

HYDRAULIC SUPPLY SYSTEMS

Filed May 31, 1967

INVENTOR
JAMES O. BYERS, JR.

BY *Dodge and Sons*

ATTORNEYS

Nov. 19, 1968   J. O. BYERS, JR   3,411,295
HYDRAULIC SUPPLY SYSTEMS
Filed May 31, 1967   12 Sheets-Sheet 11

INVENTOR
JAMES O. BYERS, JR.

BY

ATTORNEYS

3,411,295
HYDRAULIC SUPPLY SYSTEMS
James O. Byers, Jr., Kalamazoo, Mich., assignor to General Signal Corporation, a corporation of New York
Filed May 31, 1967, Ser. No. 642,436
31 Claims. (Cl. 60—52)

ABSTRACT OF THE DISCLOSURE

Supply systems for hydraulically actuated loads. Each system uses closed center distributing valves, and a separate fluid delivery-control device which is positioned by a servo control that responds to actuation of the distributing valves. The servo control employs a hydraulic Wheatstone bridge whose command orifices are arranged in series or in parallel and are controlled either by manually operated distributing valves, or by pilot valves which also position main distributing valves through secondary hydraulic Wheatstone bridge servo controls. The fluid delivery-control device is a bypass valve in cases where the supply pump is of the fixed delivery type, and is the pump delivery control element in cases where a variable delivery pump is used. In the first case, the bypass valve may discharge directly to tank or to a second fluid-utilization circuit. The distributing valves can be arranged in a parallel, series or tandem flow circuit, and some versions afford a selection between tandem and parallel circuits.

Background of the invention

The present invention relates to hydraulic power systems, and particularly to systems for delivering hydraulic fluid at a controlled flow rate to one or several hydraulic motors.

One common system of this kind in use today comprises a fixed delivery pump, an open center distributing valve, which is supplied by the pump and which contains one or more valving units, and one or more hydraulic cylinders or rams which are controlled by the valving units. The valving units may be connected in a series, parallel or tandem (i.e., series-parallel) circuit, but, in any event, each has a neutral position in which it completes a bypass or unloading path between the pump and a reservoir or tank. Frequently, the valving units take the form of sliding plunger valves and are designed so that they hydraulically lock the controlled cylinders when they are in their neutral positions. As a plunger is shifted away from the neutral position, it gradually closes the open center unloading path and opens a supply path to the cylinder. This graduating action enables the operator to control the rate of flow to the cylinder, and consequently the speed of movement of the cylinder. If the cylinder is of the double-acting type, the direction in which the plunger is shifted from neutral position determines which side of the cylinder receives fluid from the pump. In this case, the plunger also opens a return path from the opposite side of the cylinder.

The conventional system is generally satisfactory, but it does have several disadvantages, among which are high pressure losses when the valving units are in neutral position, high plunger-actuating forces and long plunger strokes with a limited portion of each stroke being available for flow metering. In an effort to eliminate these and other disadvantages, it has been proposed to design each valving unit as a closed center valve, and to employ a separate bypass valve to control the unloading path between the pump and the tank. The distributing valve contains a pilot path which interconnects the pump and the tank, and which contains a fixed reference orifice and a series of variable, normally open command orifices, each of which is controlled by one of the valve plungers. The bypass valve is operated by a piloted motor which responds to the pressure in the pilot path at a point between the fixed orifice and the group of command orifices. In cases where the command orifices are upstream of the reference orifice, the piloted motor acts to open the bypass valve against the opposing bias of a spring, and, in cases where the reference orifice is upstream of the command orifices, the bypass valve is urged closed by the spring and the piloted motor and is shifted in the opening direction by the output pressure of the pump. Regardless of which design is used, the over-all operation of the system is the same. As a plunger is shifted away from neutral position to decrease the flow area of a command orifice, the bypass valve shifts to alter the pressure drop between pump and tank as required to offset the change in pilot pressure caused by closing the control orifice. In other words, this type of system is, in effect, a regulator that maintains substantially constant the pressure drop across the reference orifice.

The regulator type of control just mentioned performs satisfactorily as a supply pressure control device, since it causes supply pressure to vary directly as the pressure drop across the command orifice. And, if all things were ideal, the regulator also would serve to meter flow. However, experience shows that it is not capable of affording the flow metering action which characterizes the conventional open center plunger valve. The main reason for this failure is that the pressure required to initiate movement of the cylinder and load is higher than the pressure required to keep the load moving at a constant speed. This is so first, because the static or break away friction of the cylinder and load is higher than the friction encountered during movement, and second, because the force required to accelerate a body always is greater than the force required to maintain motion of the body. In the operation of a real system, the operator shifts the valve plunger until the bypass valve has closed far enough to raise supply pressure to the level required to cause the cylinder to commence to move the load. As soon as the load begins to move, the pressure in the cylinder will decrease suddenly and there will be a steep increase in the rate of flow from the pump to the cylinder. Supply pressure will now decrease and the regulator will move the bypass valve toward closed position in an effort to maintain constant the pressure drop across the reference orifice. However, since, in the normal case, the differential between break away pressure and the pressure required for constant speed movement is greater than the line loss or pressure drop from the pump to the cylinder at maximum delivery rate, even complete closure of the bypass valve will not be effective to restore supply pressure to the level it achieved at the instant movement commenced. Therefore, once the load starts to move, the bypass valve will close immediately, and the operator will not be able to control the rate of flow to the cylinder.

Theoretically, the pressure regulating type of system can be made to meter flow by using a biasing spring for the bypass valve which has a very high rate. The idea here is to vary the bias acting on the bypass valve in accordance with valve position so that it is no longer necessary to maintain a constant pressure drop across the reference orifice. With this change, the shifting forces acting on the bypass valve can be put in equilibrium at a supply pressure less than break away pressure and with the bypass valve partially open. This means that the bypass valve will have a range of movement in which it can meter flow, and that the rate of flow to the cylinder can be varied manually merely by changing the position of the distributing valve plunger. However, for this scheme to be effective, the rate of the biasing spring must be high enough to insure that the change in the pressure drop across the reference orifice which occurs as the bypass valve shifts from open to closed position is comparable to the change in supply pressure which occurs at the instant the load commences to move. Since the last mentioned pressure change can be several hundred pounds per square inch, it follows that the bypass valve will impose a minimum backpressure on the pump which is at least that large. In other words, when all of the plungers are in neutral position, the pump will always be loaded to at least 200–500 p.s.i. Obviously this is intolerable.

Summary of the invention

The object of the present invention is to provide a hydraulic supply system which affords to the operator the same degree of flow rate control as the conventional open center valve, which eliminates many of the disadvantages of that valve, and which makes possible realization of other desirable results. According to the invention, the system includes a closed center distributing valve, having one or more valving units, a control device for varying the rate of delivery of fluid from the source of hydraulic fluid to the distributing valve, and a position responsive servo control which alters the setting of the control device automatically in accordance with actuation of one of the valving units. The rate control device can be either a bypass valve or a pump delivery control element, depending upon whether the source is a fixed or a variable delivery pump, but, in all cases, the servo control inlcdues a hydraulic Wheatstone bridge whose input junctions are connected with the source and tank, respectively. One leg of the bridge contains a group of variable command orifices which are controlled by the valving units and, where more than one such unit is employed, these orifices can be connected either in series or in parallel. When one of the valving units is actuated, the flow area of the associated command orifice is varied progressively to thereby unbalance the bridge and create a differential between the pressures at its output junctions. This differential is used to operate the rate control device. Rebalancing of the bridge is accomplished by a variable feedback orifice which is located in another leg and whose flow area is varied progressively by the rate control device as it moves to increase or decrease delivery rate. In the preferred form of the invention, the command leg of the bridge contains an auxiliary variable orifice whose flow area varies in response to the output pressure of the source and which, upon the occurrence of a predetermined high pressure, so changes the pressures at the output junctions of the bridge that the rate control device moves to a reduced delivery position. This auxiliary control performs either a relief function or a pressure compensating function depending upon whether the rate control device is a bypass valve or a pump delivery control element.

Inasmuch as the rate control device is operated by the pressures at the output junctions of the bridge, and the magnitudes of these pressures are a function of the output pressure of the source, it is necessary to include in each embodiment some means to insure the existence of a minimum supply pressure high enough to operate the rate control device. In those versions of the invention which use a fixed delivery pump and a bypass valve, this means can be a biasing spring, which urges the bypass valve closed, or a restriction, preferably a low pressure relief valve, located in the discharge path of the bypass valve. In embodiments which employ a variable delivery pump, the required minimum pressure is maintained by limiting pump delivery rate to a value greater than zero, and in providing a restricted exhaust path from pump to tank which is opened automatically whenever the delivery control element is moved to the minimum delivery position.

The invention encompasses several schemes for incorporating the command orifices in the distributing valve. In the case of small sliding plunger valving units, the simplest arrangement is to use a portion of the plunger itself as the orifice so that, as the plunger is shifted, the flow area is automatically varied. In large valves, where incorporation of the orifice on the plunger could result in an excessive increase in plunger length, and consequently weight, the command orifice can be designed as a separate part which is mechanically connected with the valve-actuating lever so that it is operated in unison with the plunger. Another alternative for large valves, and also a suitable scheme for use in cases where the distributing valve must be operated from a remote location, consists in incorporating the command orifice in a pilot valve which, through a secondary Wheatstone bridge type of servo control, also serves to actuate the valving unit in the distributing valve. In its preferred form, the secondary servo control comprises two Wheatstone bridges, each of which is effective to position the main valving unit at one side of its neutral position. This two-bridge control insures that the main unit will return to its neutral position whenever the pilot valve is in its neutral position or there is a failure of hydraulic power. The secondary servo control also includes mechanism which insures that the main valving unit will remain in or move to its neutral position whenever supply pressure is less than the load pressure in the associated cylinder. In effect, this mechanism performs the function of the conventional load drop check valve, and thus eliminates the need for such a valve. This is an important advantage, particularly in large distributing valves.

In a further embodiment of that form of the invention which utilizes a fixed delivery pump and a bypass valve, the bypass valve discharges to a sub-circuit which includes a second distributing valve and a second bypass valve. The second bypass valve has its own Wheatstone bridge servo control, which is unbalanced by actuation of the second distributing valve, so the sub-circuit operates in exactly the same way as the main circuit when the latter is idle. This scheme is particularly useful in vehicles having hydraulically operated steering gear as well as hydraulically powered implements, because it allows both circuits to be supplied from a single pump and yet gives flow priority to the steering function without requiring the priority valve which characterizes prior installations of this type.

Another desirable effect of this invention is that it makes possible the provision of a simple multiple plunger distributing valve which can afford either a tandem or a parallel flow circuit depending upon which of two plunger designs is used. In addition, such a valve can utilize a "float" plunger in any of its valve banks, and, in the case of the parallel flow circuit arrangement, shifting of this plunger to its "float" position will not preclude the parallel-connected plungers from actuating the cylinders they control. In the past, a "float" plunger which provides a direct interconnection between the two sides of the controlled cylinder and does not unload the pump in "float" position could be used only in a limited number of valve banks.

Descriptive of the drawings

Various embodiments of the invention are described herein with reference to the accompanying drawings in which:

FIG. 1 is a schematic diagram of a typical embodiment using a fixed delivery supply pump and a bypass valve.

FIG. 1a is a schematic diagram of a portion of the FIG. 1 system showing an alternative method of maintaining a minimum supply pressure in the system.

FIG. 2 is an axial sectional view of the actual bypass valve employed in the system of FIG. 1.

FIG. 3 is a sectional view of the actual distributing valve employed in the system of FIG. 1.

FIGS. 4 and 5 are sectional view taken on lines 4—4 and 5—5, respectively, of FIG. 3.

FIGS. 6–11 are schematic diagrams of the servo control schemes which can be used when the command orifices are connected in parallel.

FIGS. 12–17 are schematic diagrams of the servo control schemes which can be used when the command orifices are connected in series.

Figure 6:
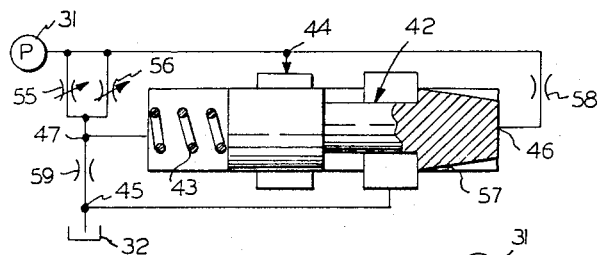
Figure 8:
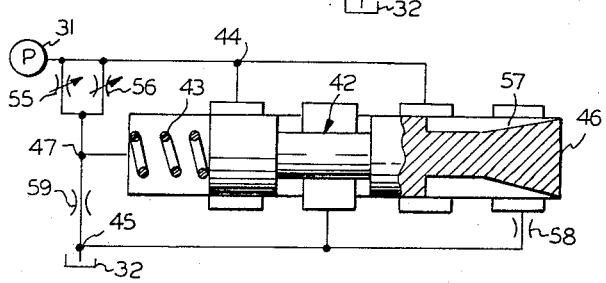
Figure 10:
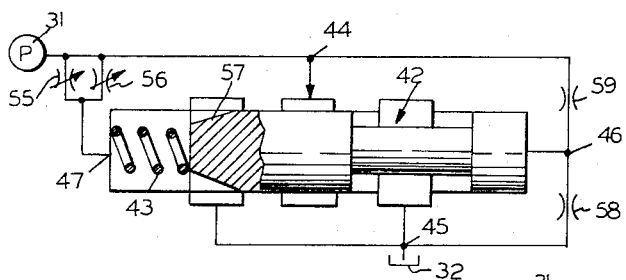

FIG. 18 is a schematic diagram of the pressure relief scheme for systems using the servo control in FIGS. 6, 8 or 10.

Figure 7:
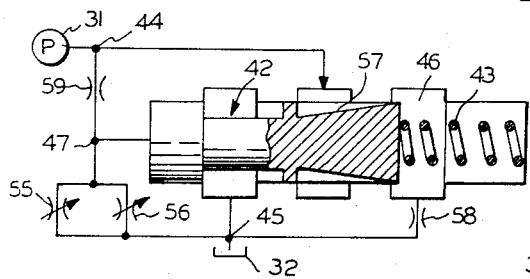
Figure 9:
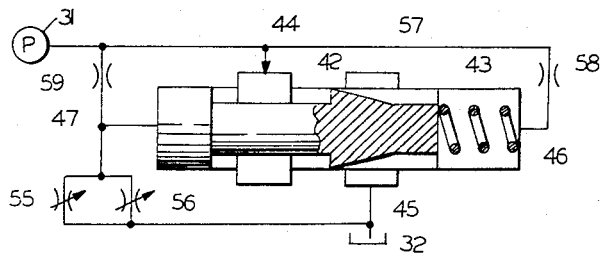
Figure 11:
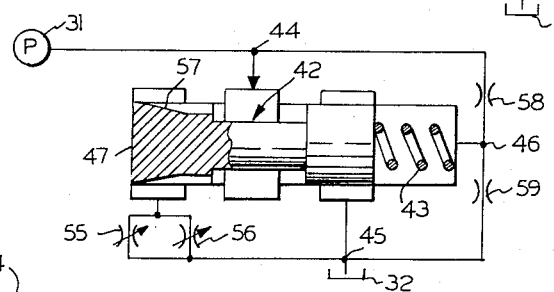

FIG. 19 is a schematic diagram of the pressure relief scheme for systems using the servo control in FIGS. 7, 9 or 11.

Figure 13:
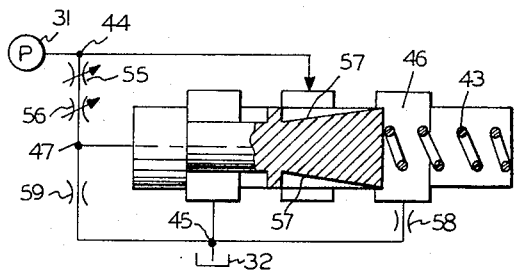
Figure 15:
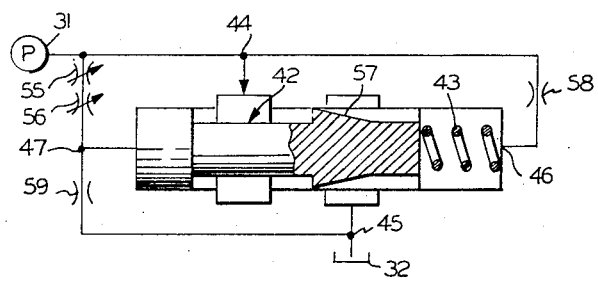
Figure 17:
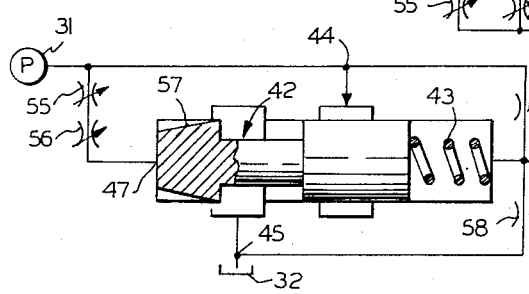

FIG. 20 is a schematic diagram of the pressure relief scheme for systems using the servo control of FIGS. 13, 15 or 17.

Figure 12:
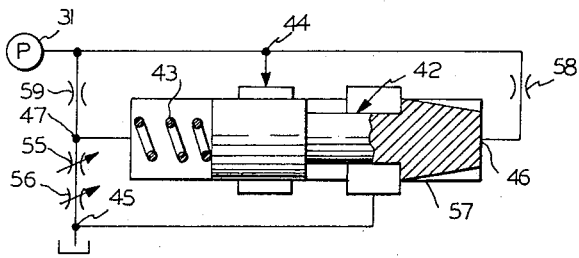
Figure 14:
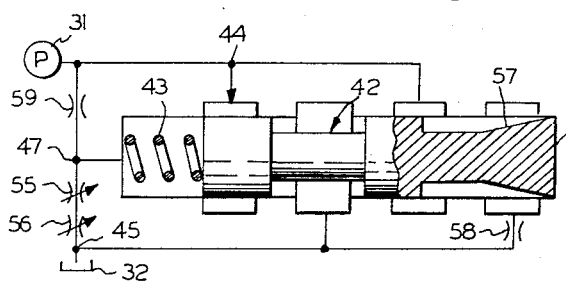
Figure 16:
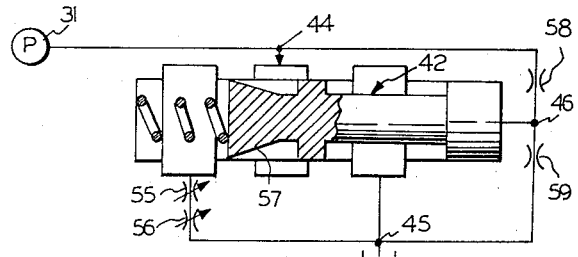

FIG. 21 is a schematic diagram of the pressure relief scheme for systems using the servo control of FIGS. 12, 14 or 16.

FIG. 22 is a sectional view of an alternative distributing valve which incorporates bypass assembly 35, and which affords a selection between tandem and parallel flow circuits.

FIG. 23 is a schematic diagram of a duplex supply system which gives one service or demand priority over the others.

Figure 24:
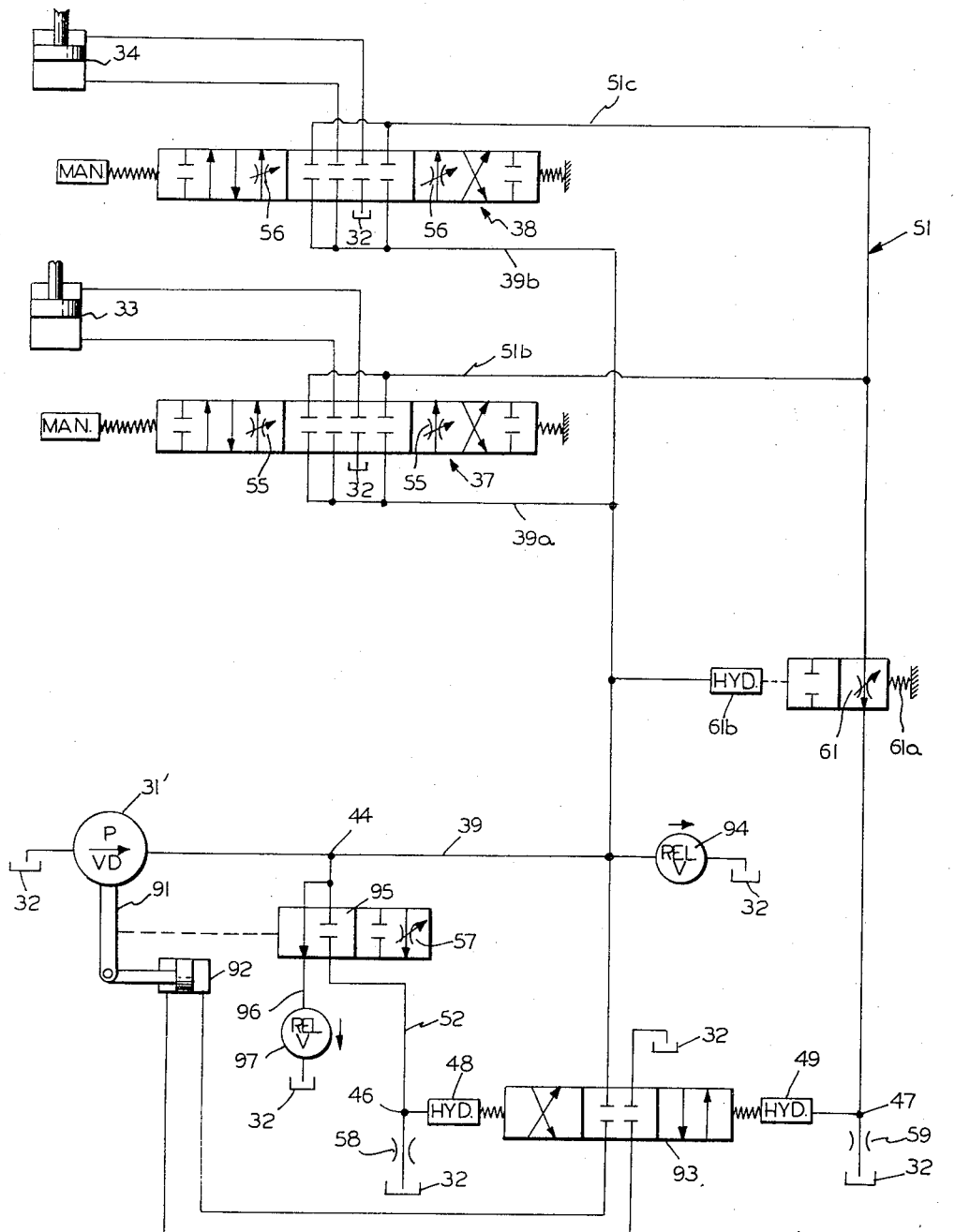

FIG. 24 is a schematic diagram of a typical supply system employing a variable delivery pump.

Figure 25:
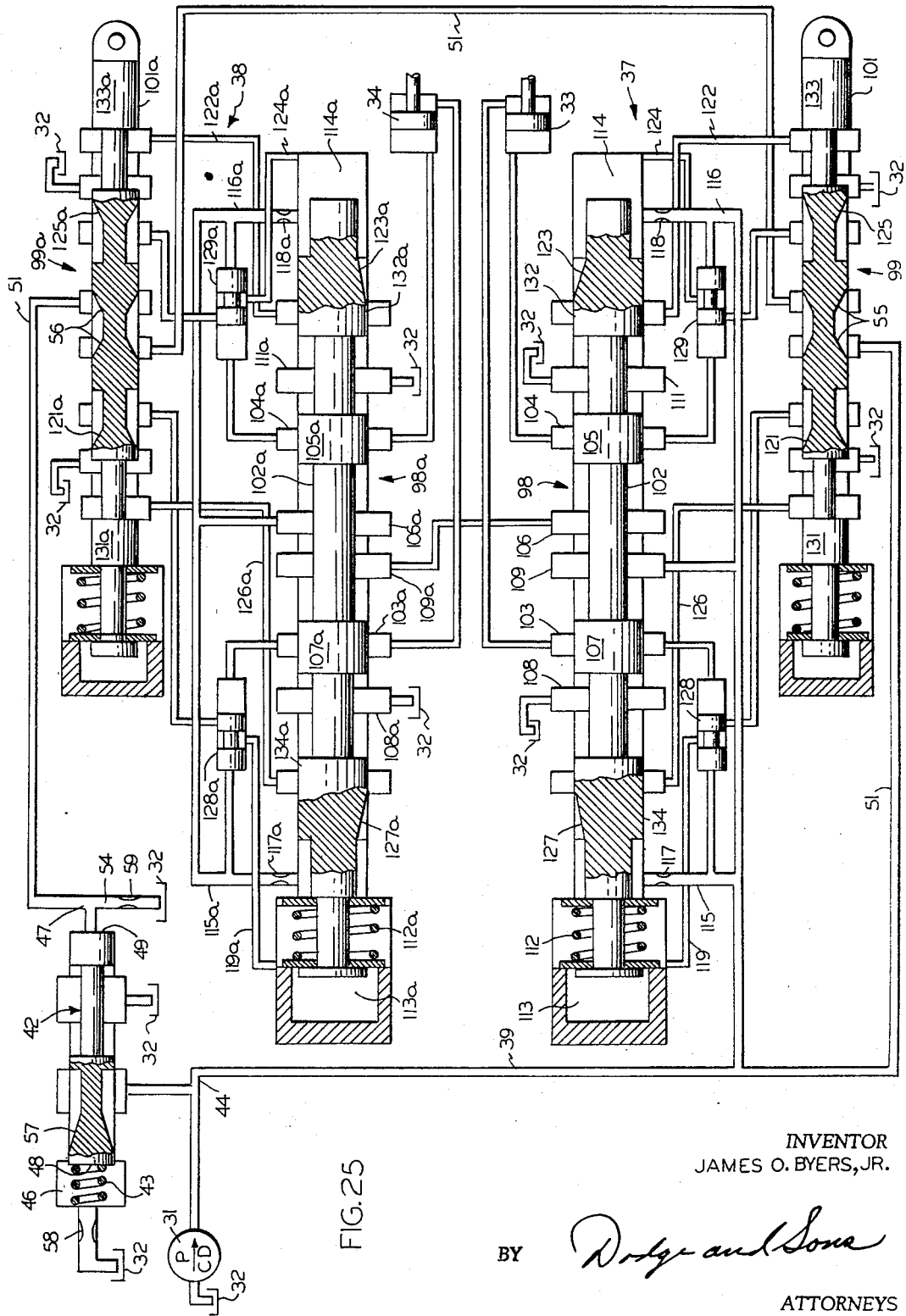

FIG. 25 is a schematic diagram of a typical supply system in which the command orifices are embodied in pilot valves which also serve to control the operation of the main valving units of the distributing valve.

FIG. 26 is a sectional view of a distributing valve embodying the concepts shown schematically in FIG. 25.

Figure 27:
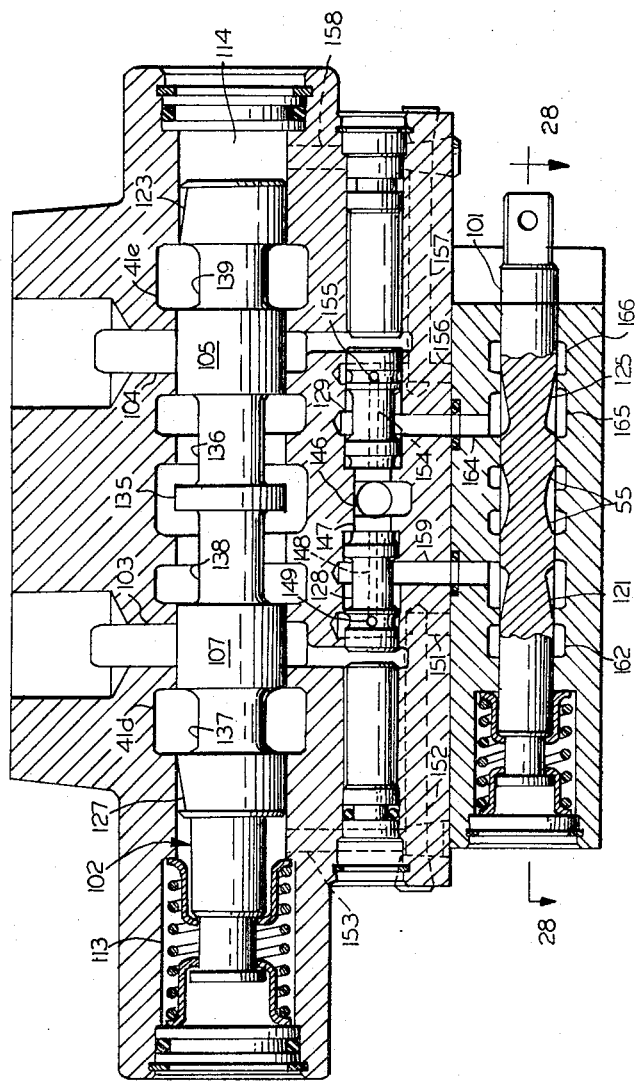
Figure 28:
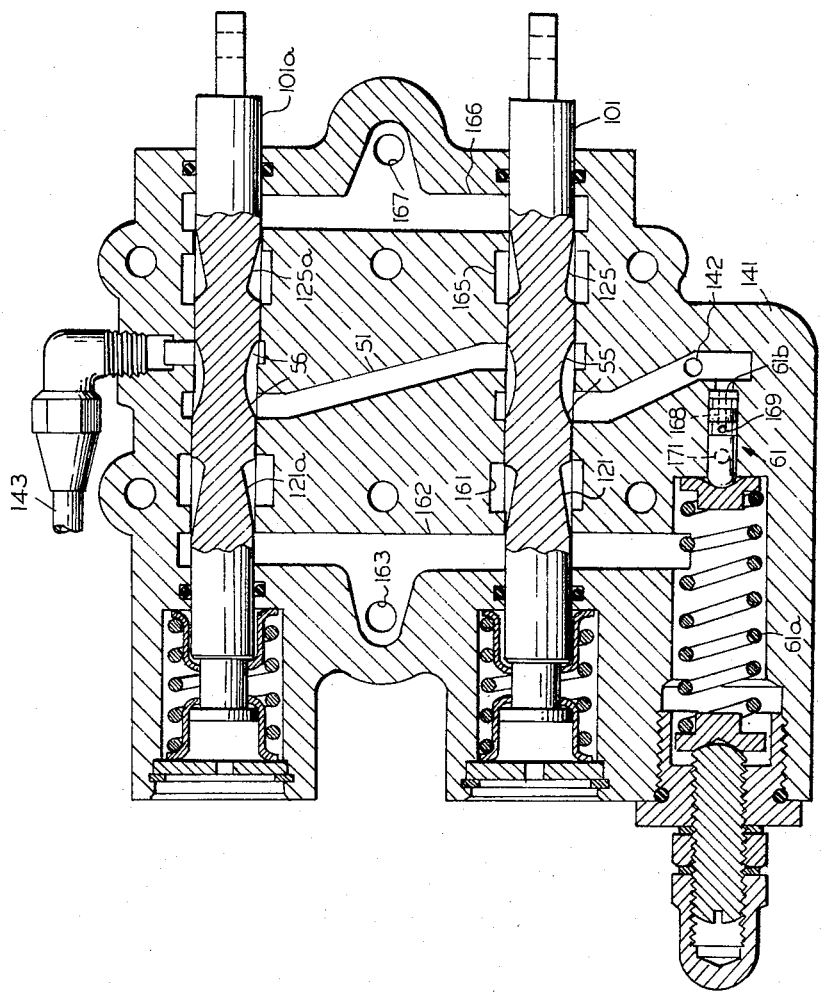

FIGS. 27 and 28 are sectional views taken on lines 27—27 and 28—28, respectively, of FIG. 26.

Where convenient, the same or related reference numerals are used throughout the drawings to identify parts performing similar functions.

*Description of the embodiments of FIGURES 1–21*

The improved supply system shown in FIG. 1 includes a fixed delivery pump 31 which draws fluid from a tank 32 and delivers it to ta pair of cylinders 33 and 34 through a bypass valve assembly 35 and a closed center distributing valve 36. Distributing valve 36 comprises a pair of three-position, manually operable valving units 37 and 38 which are connected in a parallel circuit by the branches 39a and 39b of supply passage 39, and by the branches 41a and 41b of exhaust passage 41. Each valving unit has a neutral, hold position, toward which it is biased by a centering spring, and in which it hydraulically locks the associated cylinder and isolates the supply branch 39a or 39b from the exhaust branch 41a or 41b. The cylinder 33, controlled by valving unit 37, is of the single-acting type, and therefore, as this unit moves to the right and left from the neutral position, it progressively connects the working space 33a of the cylinder with the supply branch 39a and the exhaust branch 41a, respectively. Valving unit 38, on the other hand, controls a double-acting cylinder and, therefore, as it moves to the right from neutral position, it opens a supply path between branch 39b and head end 34a and an exhaust path between rod end 34b and branch 41b, and as it moves to the left it opens a supply path from branch 39b to rod end 34b and an exhaust path from head end 34a to branch 41b. Although I have illustrated single-acting and double-acting valving units, it will be understood that both units could be of either type.

Bypass assembly 35 includes a bypass valve 42 designed to progressively open and close a vent path leading from supply passage 39 to tank 32, and thereby vary the rate of delivery of fluid to distributing valve 36. Valve 42, which is biased toward closed position by a spring 43, is positioned by a servo control that responds to movement of the valving units 37 and 38; the control being so arranged that as unit 37 is shifted to the right from neutral position, or unit 38 is shifted in either direction from neutral position, the bypass valve is moved in the closing direction. The servo control comprises a hydraulic Wheatstone bridge having a pair of input junctions 44 and 45, which are connected, respectively, with pump 31 and tank 32, a pair of output junctions 46 and 47, which are connected, respectively, with a pair of opposed fluid pressure motors 48 and 49 that shift valve 42, and four conduit legs 51–54, which interconnect these junctions. Bridge leg 51 includes a common portion defined by supply passage 39, a second common portion 51a, and two interconnecting, parallel branches 51b and 51c containing variable command orifices 55 and 56, which are controlled by valving units 37 and 38, respectively. Command orifice 55 is closed when unit 37 is in neutral position, or in any position to the left of neutral, and is progressively opened as the unit moves to the right from neutral. Command orifice 56, on the other hand, is closed in the neutral position of unit 38 and is progressively opened as the unit is shifted in either direction from this position. It should be noted that two orifices 56 are indicated in FIG. 1 because, in the actual physical embodiment, this command orifice is defined by one portion of unit 38 during rightward movement from neutral position and by a different portion during leftward movement. Bridge leg 52 contains a variable feedback orifice 57 whose flow area varies in response to movement of bypass valve 42, and which serves to rebalance the bridge after it has been unbalanced by closure of one of the command orifices. The feedback orifice is so arranged that it is opened when the bypass valve opens. The remaining legs 53 and 54 of the Wheatstone bridge are provided with fixed reference orifices 58 and 59. It is assumed herein that motors 48 and 49 have equal effective areas. Therefore, orifices 58 and 59 are so sized that the servo control tends to maintain the ratio of the flow area of orifice 58 to the flow area of feedback orifice 57 substantially equal to the ratio of the flow area of command orifice 55 or 56 to the flow area of orifice 59. Of course, full equality of these ratios cannot be realized because the bias exerted by spring 43 does vary with the position of valve 42.

When the FIG. 1 system is in operation, and valving units 37 and 38 are in their neutral positions, the command orifices 55 and 56 are closed and the feedback orifice 57 is open. Consequently, the pressure at output junction 46 will be higher than the pressure at junction 47, and motor 48 will hold bypass valve 42 in the illustrated position in which pump 31 is in substantially free communication with tank 32. It will be noted that, since bypass valve 42 is biased closed by spring 43, it will restrict the unloading path and maintain the pressure at junction 44 slightly higher, for example 40 p.s.i. higher, than the pressure at junction 45. While this means that the pump will be loaded slightly, it is necessary that a minimum pressure of this magnitude be maintained is order to insure that motor 49 will be able to shift bypass valve 42 in the closing direction when one of the command orifices is subsequently opened.

When the operator shifts valving unit 37 to the right to extend cylinder 33, command orifice 55 is gradually opened, and oil is allowed to flow through bridge leg 51 to output junction 47. This raises the pressure at the junction and causes motor 49 to move bypass valve 42 in the closing direction. As the bypass valve moves, feedback orifice 57 is gradually closed to thereby effect a progressive increase in the pressure at output junction 46. When the pressure at junction 46 reaches a level at which motor 48 balances the combined forces exerted by spring 43 and motor 49, the bridge will again be in balance, and valve 42 will come to rest. The new position of valve 42 will correspond to the present position of valving unit 37. During the closing movement of valve 42, the pressure at input junction 44, and in supply passage 39, rises. When this pressure exceeds the break away pressure of cylinder 33, the cylinder will commence to move in the extending direction. Although this movement of the cylinder will be accompanied by a sudden decrease in the supply pressure at junction 44, this will have no effect upon the position of bypass valve 42 because the pressures at the output junctions 46 and 47 will change equal amounts. Therefore, in contrast to the pressure regulating type of control described earlier, the bypass valve in FIG. 1 will not shift to closed position when the cylinder commences to move.

In order to increase the speed of movement of cylinder 33, the operator will shift valve 37 further to the right. This movement increases the flow area of command orifice 55 and raises the pressure at output junction 47. As a result, motor 49 will move bypass valve 42 to a new position in which it restricts to a greater degree the unloading path between pump 31 and tank 32, and thus causes a larger portion of the output of pump 31 to be delivered to cylinder 33. When the operator moves valve 37 to the limiting right-hand position, command orifice 55 will be fully open, and the pressure at output junction 47 will be a maximum. At this time, motor 49 will completely close valve 42 so that the full output of pump 31 will be delivered to cylinder 33.

When the operator releases valving unit 37 and thereby allows the centering spring to return it to neutral position, command orifice 55 will gradually close and the pressure at output junction 47 will decrease. Motor 48 now moves bypass valve 42 toward its open position. Therefore, when valving unit 37 reaches its neutral position, bypass valve 42 will have been shifted to its open position, and the pressure at junction 44 will again be at the minimum value established by spring 43.

Leftward shifting of valve 37 from its neutral position opens a vent connection from the working space 33a of cylinder 33 to tank 32, but does not open command orifice 55. Therefore, during retraction of cylinder 33, bypass valve 42 remains open, and pump 31 is not loaded beyond the minimum level prevailing in the neutral position.

Movement of valving unit 38 in either direction from neutral position effects progressive opening of command orifice 56, and thus has the same effect upon bypass valve 42 as rightward movement of valving unit 37. In other words, during both the extension and the retraction strokes of cylinder 34, the position of bypass valve 42, and consequently the speed of movement of cylinder 34, will vary in accordance with the position of valving unit 38.

Since the valving units 37 and 38 are connected in parallel, both can be operated at the same time. If unit 37 is at the left side of its neutral position when unit 38 is actuated, each of the cylinders 33 and 34 will operate as though the other were idle, and the position of bypass valve 42 will depend solely upon the position of unit 38. On the other hand, if unit 37 is at the right side of neutral when unit 38 is actuated, the cylinder subject to the smaller load will move first, and, because both of the parallel-connected command orifices 55 and 56 are now open, bypass valve 42 will assume a position closer to closed position than the position called for by either of the units. This means that the rate of delivery of oil to the distributing valve 36 will be determined by the joint effect of the two units 37 and 38 and not by the individual effect of either unit. Since this mode of operation is exactly the same as that which characterizes any conventional parallel circuit valve, use of the invention requires no unusual or different training of the operator.

It will be noticed in FIG. 1 that the common portion 51a of bridge leg 51 contains an auxiliary variable orifice 61 which is biased open by a spring 61a and is shifted in the closing direction by a fluid pressure motor 61b which responds to the supply pressure in passage 39. This auxiliary orifice 61 serves as the pilot stage of a relief valve whose second stage is the bypass valve 42. During operation of cylinders 33 and 34 at normal pressure levels, spring 61a holds orifice 61 in its open position, and the system operates as described above. However, when the load on the cylinder being actuated rises to an excessive level, motor 61b will overcome the bias of spring 61a and commence to reduce the flow area of orifice 61. As in the case of the command orifices 55 and 56, closure of orifice 61 reduces the pressure at output junction 47 and causes motor 48 to shift bypass valve 42 in the opening direction. Valve 42 will continue to move in this direction as long as orifice 61 is closing. The resulting progressive reduction in the rate of delivery of oil to valve 36 prevents supply pressure from rising above the allowable maximum. If the load on the cylinder is large enough, orifice 61 will be closed, and bypass valve 42 will move all the way to its fully open position. As the load on the cylinder reduces, spring 61a will gradually increase the flow area of orifice 61 and thereby effect a decrease in the pressure at junction 47. Now motor 48 starts to move bypass valve 42 in the opening direction. When the overload condition has abated, valve 42 will resume the position called for by the current setting of the command orifices 55 and 56.

The structural details of a typical bypass assembly 35 are shown in FIG. 2. In this design, the assembly comprises a body formed with a through bore 62 whose opposite ends are closed by threaded plugs, and which receives a sliding spool type bypass valve 42. The input junction 44 of the Wheatstone bridge is defined by a central annular chamber which encircles bore 62, the output junction 47 is defined by a second such chamber, and the output junction 46 is defined by a closed space at the left end of bore 62. Two additional annular chambers, which are connected with an exhaust port (not shown), serve as portions of bridge legs 52 and 54, and intersecting axial and radial passages formed in spool 42 serve as the third bridge leg 53. The opposite ends of spool 42 serve as the fluid pressure motors 48 and 49, and a series of circumferentially spaced, tapered, longitudinal grooves formed in the left end of spool 42 define feedback orifice 57. The unloading path in this embodiment includes the portion of bore 62 between chambers 44 and 52, and it is controlled by the left edge of spool land 42a.

In the embodiment of the bypass assembly shown in FIGS. 1 and 2, spring 43 serves to maintain the required minimum supply pressure in the system. This is probably the simplest way of accomplishing the desired result, but, since the spring force is a greater proportion of the total closing force at low pressures than it is at high pressures, the operation of the bypass valve is affected somewhat by variations in supply pressure. Another, but generally less desirable, scheme for maintaining a prescribed minimum supply pressure consists in adding a flow restrictor to the discharge connection leading from bypass valve 42 to tank 32. In this case, the spring 43 is omitted. As shown in FIG. 1a, the flow restriction preferably is a low pressure relief valve. This type of restrictor is considered better than an orifice because the backpressure it creates is substantially independent of flow rate. This characteristic is important when the system is used on an earth-moving vehicle because the pump 31 is driven by the engine and its discharge rate per unit of time will vary with engine speed. While the alternative approach of FIG. 1a eliminates the slight drawback of the first approach, it is more complex and increases the cost of the system.

The details of construction of a typical parallel circuit distributing valve 36 are shown in FIGS. 3–5. In this embodiment, the body of valve 36 is formed with a supply manifold 39 having a port 39c through which it can be connected with the chamber 44 of bypass assembly 35, an exhaust manifold 41 having a port 41c through which it can be connected with tank 32, a bridge leg passage 51a having a port 51f adapted to be connected with the chamber 47 in valve 35, and four cylinder ports (not shown) which lead to the annular chambers 63, 63a, 64 and 64a associated with the valving units 37 and 38. Although the body of valve 36 is designed to accommodate two double-acting valving units, the illustrated embodiment employs only one such unit. Therefore, the annular chamber 63a performs no function in this design, and consequently the cylinder port communicating with it is plugged.

The valving unit 37 in FIG. 3 includes a single-acting hollow plunger 65 formed with a central annular groove 66 and two lands 67 and 68, and containing an axial bore 69 which is intersected by two spaced sets of radial passages 71 and 72. Mounted in bore 69 is a conventional load drop check valve 73. When plunger 65 is in the illustrated neutral position, land 67 isolates cylinder chamber 63 from the other fluid-containing spaces of the valve, so the single-acting cylinder connected with this chamber is hydraulically locked against movement by the load. Rightward movement of plunger 65 from neutral position brings passages 71 and 72 into registration with chamber 63 and supply branch 39d, respectively, and thereby opens a supply path to the controlled cylinder through bore 69 and load drop check valve 73. Leftward movement of plunger 65 causes passages 71 and 72 to register with exhaust branch 41d and chamber 63, respectively, and thus opens an exhaust path from the cylinder through bore 69 and the check valve. Valving unit 38 includes a hollow valve plunger 74 which is constructed in essentially the same way as plunger 65 except that it is double-acting, and thus is designed to control flow to and from both of the cylinder chambers 64 and 64a, and its left end is equipped with a combination load drop check and flow control valve 75 in lieu of the simple check valve 73 or 76 employed in plunger 65 and in its right end. Combination valves of this type are described in U.S. Patents 2,710,628 and 3,155,114, granted June 14, 1955, and Nov. 3, 1964, respectively. When plunger 74 is in the illustrated neutral position, lands 77 and 78 isolate annular chambers 64 and 64a from each other and from the other fluid-containing spaces in valve 36, so the double-acting cylinder 34 is hydraulically locked against movement in either the extension or the retraction direction. Rightward movement of plunger 74 from this position causes radial passages 79 and 81 to register with chamber 64a and exhaust branch 41e, respectively, and thereby vent the rod end of cylinder 34 to tank 32 through axial bore 82 and check valve 76, and also causes passages 81a and 79a to register with chamber 64 and supply branch 39d, respectively. Simultaneously, radial passage 83 registers with supply chamber 39e. When supply pressure rises to a level higher than the load pressure in chamber 64 and in the space to the left of valve 75, piston actuator 84 will open valve 75 and oil will be supplied to the head end 34b of cylinder 34. When plunger 74 is shifted to the left from neutral position, passages 79 and 81 will register with chambers 39e and 64a, respectively, passages 81a and 79a will register with exhaust branch 41d and chamber 64, respectively, and radial passage 85 will register with supply branch 39d. Now, oil is supplied to the rod end 34a of cylinder 34 through bore 82, check valve 76 and chamber 64a, and the head end 34b is exhausted to tank 32 through combination valve 75 which is being held open by the oil at supply pressure which acts upon its right end. Should supply pressure drop to a low level, as a result of the cylinder retracting at a rate greater than that with which pump 31 can keep pace, valve 75 will be moved in the closing direction by its biasing spring and restrict the exhaust flow from cylinder 34. Under these conditions, valve 75 performs its anti-cavitation function.

The command leg of the Wheatstone bridge in the distributing valve 36 of FIGS. 3–5 comprises the central annular chambers 51b and 51c which encircle plungers 65 and 74, respectively, a cored passage 51d which interconnects these chambers, a drilled passage 51e (see FIG. 5), a plunger bore 86, and the bridge leg passage 51a (see FIG. 4). The command orifice 55 associated with valving unit 37 is defined by a circumferential series of tapered, longitudinal grooves formed in the left edge of plunger land 68. This orifice is closed when plunger 65 is in neutral position, or in any position to the left of neutral, but opens gradually, to permit flow from supply branch 39f to chamber 51b, as the plunger is shifted to the right. The command orifice 56 associated with valving unit 38 is defined by similar longitudinal grooves in the right and left edges of plunger lands 77 and 78, respectively; the grooves in land 77 serving to progressively open communication between branch 39d and chamber 51c as the plunger 74 moves to the left from neutral position, but being closed in neutral position and in any position to the right of neutral, and the grooves in land 78 serving to open progressively communication between supply chamber 39e and chamber 51c as plunger 74 moves to the right from neutral position, but being closed in neutral position and in any position to the left of neutral. The auxiliary orifice 61, which performs the relief pilot function, is defined by the right edge of the land 87 of a spool 88 which reciprocates in the plunger bore 86 (see FIG. 4), and the fluid pressure motor 61b for closing this orifice is defined by the left end of the spool. Oil under supply pressure is delivered to motor 61b from supply manifold 39 through an orifice 89. The restriction afforded by the orifice damps movement of spool 88 and thereby makes the piloted relief scheme stable.

The operation of the bypass assembly 35 of FIG. 2 and the distributing valve 36 of FIGS. 3–5 should be evident from this description and the discussion of operation of FIG. 1, and will not be detailed.

It is important to note that the proportional control circuit shown schematically in FIG. 1, and employed in the real embodiment of FIGS. 2–5, is but one of twelve designs which may be used. For convenience of comparison, this first design is illustrated again, in a slightly different manner, in FIG. 6, and the other eleven versions are shown in FIGS. 7–17. In each case, the feedback orifice 57 is defined by a circumferential series of longitudinal grooves which are formed in the periphery of the bypass spool 42 and each of which is tapered over part or all of its length. Each orifice 57 is so designed that its flow area will be changing as bypass valve 42 moves into closed position. While the diagrams of FIGS. 6–17 are self-explanatory, the supplementary information contained in the following table should enable the reader to comprehend more quickly the differences between the controls:

| Control Version | Change in Flow Area of Command Orifice 55 or 56 Required to Close Bypass Valve 42 | Change in Flow Area of Feedback Orifice 57 as bypass Valve 42 Closes |
| --- | --- | --- |
| FIG. 6 | Increase | Decrease |
| FIG. 7 | Increase | Decrease |
| FIG. 8 | Increase | Increase |
| FIG. 9 | Increase | Increase |
| FIG. 10 | Increase | Increase |
| FIG. 11 | Increase | Increase |
| FIG. 12 | Decrease | Decrease |
| FIG. 13 | Decrease | Decrease |
| FIG. 14 | Decrease | Increase |
| FIG. 15 | Decrease | Increase |
| FIG. 16 | Decrease | Decrease |
| FIG. 17 | Decrease | Decrease |

No one of these twelve controls represents the best approach for all applications, but consideration of the following factors should enable the skilled designer to pick the best design for a particular case:

(A) *Flow loss through the Wheatstone bridge*

In most cases, the bypass valve 42 discharges directly to tank 32, so it makes no difference how much of the output of the pump is absorbed by the bridge when the bypass valve is partially or fully open. However, when the bypass valve is closed, and therefore the operator is calling for the maximum delivery rate to the distributing valve, the fluid passing through the bridge reduces the flow rate available to do work. Since each of the two paths through the bridge will subtract about 1 gallon per minute at 2500 p.s.i. system pressure when it is open, the number of control paths open after the bypass valve closes can be important. Viewed from this standpoint, the controls of FIGS. 12 and 13 are the best because, in each case, the command orifices 55 and 56 are in one flow path, the feedback orifice 57 is in the other flow path, and all of these orifices are closed when the bypass valve is closed. The next best controls are those shown in FIGS. 6, 7 and 14–17. In each of these embodiments, one of the two control paths through the bridge is closed when bypass valve 42 is closed. The worst controls are those of FIGS. 8–11, because here both flow paths are opened as the bypass valve closes.

In some applications, such as the one illustrated in FIG. 23, the fluid discharged from bypass valve 42 can be utilized in a secondary circuit. If the flow requirements of the second circuit are more demanding than those of the first, it is desirable to minimize flow losses when the bypass valve 42 of the first circuit is open. There, in cases where input junction 45 is connected directly with tank 32, as in FIG. 1, FIGS. 8 and 9 are the best control schemes, FIGS. 6, 7, 10, 11, 14 and 15 are next best, and FIGS. 12, 13, 16 and 17 are the worst. On the other hand, if, as in FIG. 23, junction 45 is connected with the secondary circuit, all of the oil flowing through the first bridge necessarily will be available for use in the second circuit, and consequently the rate of supply to that circuit will not be affected by the type of control used in the first circuit.

(B) Bypass valve construction

From the standpoint of the construction of the bypass valve, the schemes of FIGS. 6, 12 and 17 are preferred. This preference is based first, upon the fact that the bypass valves in these versions of the control have the simplest spools and bodies, and second, upon the fact that metering of the flow in the unloading path is accomplished as the fluid enters the peripheral spool groove. Metering at this point permits the flow force acting on the spool to be compensated more readily than when flow is metered as it leaves the peripheral groove.

The bypass valve used in FIGS. 9 and 15 is just as simple in design as the one in FIGS. 6, 12 and 17, but requires that flow through the unloading path be metered or throttled as it leaves the spool groove.

The designs of FIGS. 7, 10, 13 and 16 rank next in order of preference, as far as bypass valve construction is concerned. Each of these bypass valves is a little more complex than the ones used in the five schemes mentioned above, because it requires an additional land in the valve body, but, like the best schemes, these too meter the flow as it enters the spool groove. The bypass valve of FIG. 11 is no more complex than those in FIGS. 7, 10, 13 and 16, but it has the drawback of metering flow as it leaves the spool.

The remaining versions, namely FIGS. 8 and 14, meter the flow as it enters the spool, but they are the least attractive from the standpoint of bypass valve construction because the housings of these valves are the most complex of the twelve.

(C) Distributing valve construction

In cases where a new distributing valve is being designed for use in the improved supply system, and the valving units always are arranged in a parallel circuit, the control circuits shown in FIGS. 6, 8 and 10 are preferred. The reason for this is that these designs require a minimum increase in length of the valve plungers, do not destroy the symmetry of the plunger, and can be incorporated in a way that results in the plunger seals (see seals 70 in FIG. 3) being subjected only to tank pressure. The valve shown in FIG. 3 is a good example of this. While neither plunger 65 nor plunger 74 is truly symmetrical, it will be realized that this is attributable, not to the inclusion of the command orifice, but to the fact that one plunger is of the single-acting type and the other includes an anti-cavitation flow control device. In any event, the passages which open through the outer peripheral surfaces of the plungers are symmetrical about the center of the plunger, and therefore each plunger can be reversed in its bore and operated from the left side of the valve body.

In cases where the designer is creating a new distributing valve of the type shown in FIG. 22, in which the valving units are connected in either a tandem or a parallel circuit depending upon which of two plunger designs is used, the control schemes of FIGS. 7, 9 and 11 probably are the most suitable ones to use. I reach this conclusion because it appears that the command orifices for these versions of the control circuit can be incorporated with a minimum increase in plunger length and without destroying plunger symmetry. While plunger length in the FIG. 22 embodiment is greater than in FIG. 3, it will be evident that it would be even greater if the control of FIG. 6, 8 or 10 were used, assuming that plunger symmetry were retained. It will also be obthat plunger symmetry were retained. It will also be observed that the plunger seals in FIG. 22 are subjected to the control pressures upstream of the command orifices. This is less desirable than the arrangement of FIG. 3, but it is not intolerable because these pressures can be kept below about 250–300 p.s.i.

In cases, such as the one illustrated in FIG. 25, wherein the distributing valve employs piloted valving units, the series control schemes of FIGS. 12–17 are preferred because they result in the shortest length for the plunger of the pilot valve. The reason for this will be evident when it is recalled that the command orifices in these designs are open when the valving units, or their pilot valves, are in neutral position. With this arrangement, the command circuit requires only two chambers spaced along the bore of the pilot valve. If the command orifices were in parallel, each would be closed in the neutral position of the associated pilot valve. Since the command orifice must open as the pilot valve moves in either direction from neutral, the bore of the pilot valve would have to be provided with three chambers.

If it is desired to incorporate the command orifices in a tandem valve having the conventional Y-shaped center core (see, for example, FIG. 4 of U.S. Patent No. 3,282,-286), the series command circuits of FIGS. 13, 15 and 17 are the most attractive versions of the control scheme. The changes required to effect incorporation of one of these controls consist merely of blocking the connection between the center Y-core and the exhaust manifold, connecting the exit end of this core with a separate port which leads to the appropriate output junction of the bridge, and of equipping the inner edge of each of the main lands of each plunger with command orifice-forming notches or grooves which cooperate with the body lands to restrict flow through the Y-core as the plunger is shifted in opposite directions from neutral position. In effect, this modification converts the Y-core from an open center path into the command leg of the Wheatstone bridge.

Finally, if the command orifics are to be embodied in an existing parallel circuit valve having conventional snake coring in the center (see, for example, FIG. 1 of Patent 3,282,286), any of the series control circuits of FIGS. 12–17 may be used, and all are considered better than the parallel schemes of FIGS. 6–11. As in the preceding case, the open center core of the distributing valve is converted into the command leg of the bridge, and the inner edges of the plunger lands are formed to define the command orifices. If the command orifices are in a bridge leg connected directly with input junction 44, as in FIGS. 13, 15 and 17, the exit end of the snake core is isolated from the exhaust manifold and is ported to the appropriate output junction of the Wheatstone bridge. The entrance end of the snake core is left in communication with the supply manifold. On the other hand, if the command orifices are in a bridge leg connected directly with tank 32, the exit end of the snake core is opened to the exhaust manifold, and the entrance end is closed and ported separately to the appropriate output junction.

(D) Symmetry of control circuit

If exact duplication of performance over extreme temperature ranges is important, the controls of FIGS. 8, 9, 12 and 13 would be preferred. The reason for this is that, in these designs, the variable command orifices control the pressure in one of the motors 48 and 49 while the variable feedback orifice 57 controls the pressure in the other motor, and the relative positions of the command orifices and fixed orifice 59 is the same as the position of the feedback orifice relative to fixed orifice 58. With this arrangement, the two fixed orifices can be the same size and the two variable orifices can be the same size, and temperature effects on the circuit inherently cancel out.

Regardless of which servo control scheme is used, the auxiliary orifice 61, if it is included, is incorporated in the circuit in such manner that it causes bypass valve 42 to open upon the occurrence of an excessively high pressure in the supply path. In the servo control schemes of FIGS. 6–11, in which the command orifices 55 and 56 are connected in parallel, the auxiliary relief orifice 61 always is arranged in series with, and in the same leg of the bridge as, the command orifices, and biasing spring 61a urges the orifice toward the open position. This is illustrated schematically in FIGS. 18 and 19, which show the two possible locations of command orifices 55 and 56 relative to output junction 47. It should be noted that the auxiliary orifice 61 can be positioned either upstream or downstream of the command orifices. In the case of the controls of FIGS. 12–17, wherein the command orifices are in series, auxiliary orifice 61 always is located in a parallel branch of the command leg and is biased closed. The two possibilities for this arrangement are shown schematically in FIGS. 20 and 21. In all cases, it will be understood that the location of the variable feedback orifice has no effect upon the position of orifice 61 or upon the direction of action of biasing spring 61a.

Before proceeding with the description of the other embodiments of the invention, it will be helpful to discuss the following important advantages of the version shown in FIGS. 1 and 3–5.

(A) Reduced pressure losses when valves are in neutral

In the system of FIG. 1, the bypass assembly 35 is located at pump 31, and therefore, when the distributing units 37 and 38 are in neutral position, the pressure loss in the system is approximately that required to operate bypass valve 42, namely, about 40 p.s.i. And this neutral pressure loss is no greater, even when the system includes several, separate distributing valves, because these valves can be connected in parallel and each can be designed to control the same bypass valve. In contrast, the open center flow in a conventional system must pass through a hose or tube from the pump to a distributing valve, then through the various units of that valve, and finally through a hose or tube to the tank. Normally, the pressure loss through this conventional path is greater than 50 p.s.i. When several distributing valves are used, they are connected in a series supply path, and therefore, the open center flow path becomes even longer and more restricted, and the pressure loss is much greater.

(B) Lower plunger effort

Since the plungers used in the distributing valves employed in this invention do not meter directly the open center flow, they are not subjected to the large flow forces, and the binding caused by deflection under pressure, which normally accompany the metering operation. This means that they can employ lighter centering springs. As a result, the operator effort required to shift these plungers is considerably less than that required to shift a conventional open center plunger.

(C) Shorter plunger strokes

In a conventional valve, the stroke of the plunger is made up of four portions, namely, the deadband required to reduce pressure losses in neutral position, the deadband required to reduce cylinder port leakage in neutral position, the metering stroke, and the deadband required for the plunger to fully open the supply path to and the exhaust path from the cylinder, and to reduce leakage losses through the open center path. The present invention eliminates the deadband required to reduce the neutral pressure losses and thus results in a shorter plunger stroke. This feature permits a further reduction in operator effort because it allows the mechanical advantage of the plunger-actuating handle to be increased without also increasing the range of movement of the handle.

(D) Better flow metering

The present invention has several characteristics which contribute to improved flow metering. First, since the plunger itself does not close off the open center path, all of its stroke, except the portion required to reduce cylinder port leakage in neutral position, can be utilized to vary the flow area of the command orifice, and thus to alter the position of the bypass valve. This extension of the metering range can be accomplished without risk of increasing leakage at the bypass valve by designing the command orifice so that it suddenly closes or opens at the end of the plunger stroke. This action will cause the bypass valve to move abruptly to a closed position having a large amount of overlap. In this way, leakage along the bypass valve can be minimized.

The invention also makes it possible to counteract, to some extent, the adverse effect of load pressure on the length of the metering stroke. In the case of the conventional open center plunger, flow to the cylinder cannot be metered until the open center path has been restricted sufficiently to cause supply pressure to rise above load pressure and open the load drop check valve. Therefore, as load pressure increases, the plunger stroke available for flow metering decreases. While valves used in the systems of this invention obviously also are incapable of metering flow to the cylinder when supply pressure is less than load pressure, the effect of this condition on the length of the metering stroke can be partially offset by providing an abrupt or step change in the flow area of the command orifice as the plunger moves away from the neutral position. With this modification, slight movement of the valve plunger will cause the bypass valve to move immediately to a position in which it establishes a supply pressure comparable to the expected load pressure, and, therefore, the major portion of the plunger stroke is saved for actual flow metering purposes. In a typical case, the bypass valve will move initially to a position in which it establishes a supply pressure of 450–500 p.s.i., and thereafter its movement will be proportional to that of the valve plunger. Of course, this scheme cannot be used in cases where load pressure varies between very low and very high values, and flow metering in the low pressure range is necessary.

A third feature of the invention which contributes to an improvement in flow metering concerns the ease with which the metering action of the bypass valve can be changed to meet the requirements of a particular installation. In a conventional plunger valve, metering is controlled by notches or drilled holes in the edges of the plunger lands, and, in general, good metering requires expensive plunger configurations. In the systems of the present invention, the metering action of the bypass valve is controlled by the shapes of the command orifices. These orifices are defined by small coined grooves formed in the valve plungers, so their shapes, and consequently the metering characteristics of the system, can be changed with a minimum of of trouble and expense.

(E) Elimination of relief valve overshoot

In conventional hydraulic power systems, the rate of acceleration of the cylinder and the load is limited by the main relief valve, and experience shows that the system is loaded to the setting of the relief valve almost every time a plunger is shifted out of neutral position. Since the relief valve must open in order to limit the pressure, it follows that, each time a plunger is shifted, the system is subjected to peak pressures which exceed the setting of the relief valve. In contrast, the main stage of the relief valve in the improved system is the bypass valve itself, and it is open when the plungers are in neutral position. Therefore, when a plunger is actuated and the controlled cylinder is accelerated, supply pressure cannot rise to a peak higher than the relief valve setting.

(F) Ability to use a different relief valve setting for each of several distributing valves The systems of this invention can be designed to provide different maximum operating pressures for the controlled cylinders by merely providing an auxiliary orifice 61 for each of the pressure levels required, and arranging these orifices so that they have the desired effect upon bypass valve 42. Thus, in FIG. 1, cylinder 33 can be operated at a higher pressure than cylinder 34 by setting the illustrated orifice 61 to the high pressure level required by cylinder 33, and by providing a second of these orifices in branch 51c and setting it to the lower level required by cylinder 34. Of course, if the cylinders are operated simultaneously, both will receive fluid at the higher maximum pressure. It will be evident that this multiple pressure feature is not limited to applications in which the individual cylinders controlled by a single distributing valve 36 are to be operated at different pressures, but can be employed equally well to provide different pressure levels for groups of cylinders which are controlled either by a single distributing valve 36 or by several distributing valves.

Description of the FIG. 22 embodiment

As mentioned earlier, the present invention makes possible the provision of a distributing valve which can afford a tandem or a parallel flow circuit depending upon which of two plunger designs is used, and which also affords novel arrangements of a "float" plunger. As example of a valve of this kind is shown in FIG. 22. In this embodiment, the distributing valve 36 contains three valving units 37, 38 and 40 as well as the bypass assembly 35. Here the supply passage 39 includes an inlet port 39c and a Y-shaped center core of the type commonly used in a conventional tandem valve. The exhaust passage 41 is the common cored manifold having a pair of parallel branches 41d and 41e, and an exhaust port (not shown).

Valving unit 37 includes a three-position parallel circuit plunger 37a which resembles a double-acting version of the plunger 65 in FIG. 3. Thus, plunger 37a contains one pair of radial passages 71 and 72, which are interconnected by an axial bore containing a load drop check valve and which serve selectively to connect cylinder chamber 63 with the Y-shaped supply core and the exhaust branch 41d, and a second pair of radial passages 71a and 72a, which are interconnected by a second axial bore containing a load drop check valve and which serve selectively to connect cylinder chamber 63a with the supply core and the exhaust branch 41e. Plunger 37a is formed with a wide center neck 37b, so that as it is shifted in opposite directions from the illustrated neutral position, it never closes the center Y-core and interrupts flow to the succeeding plungers in the valve bank. Therefore, when units 37 and 38 are equipped with plungers of this type, all three of the cylinders controlled by valve 36 can be operated simultaneously.

Plunger 38a of valving unit 38, which is designed for tandem circuit operation, is identical to plunger 37a except for the addition of center land 38b. When this plunger is shifted away from neutral position, land 38b and one or the other of lands 38c and 38d closes the center Y-core and interrupts flow to the succeeding plungers. Thus, when units 37 and 38 are equipped with plungers of this design, only one cylinder can be actuated at a time. However, as will be evident from the following description, the cylinder controlled by unit 40 can "float" any time, even when one of the other cylinders is being actuated.

The "float" plunger 40a employed in valving unit 40 is a four-position plunger, and, in the form illustrated, it can be used in any valving unit of the bank to provide parallel circuit operation. At its left end, plunger 40a is provided with a pair of radial passages 40b and 40c which, as in the case of the passages 71 and 72 in plunger 37a, are interconnected by an axial bore containing a load drop check valve and serve to connect cylinder chamber 40d with either the Y-core or exhaust branch 41d. At its right end, plunger 40a contains another pair of radial passages 40e and 40f, but, unlike their counterparts 71a and 72a in plunger 37a, these passages are connected with each other and with a third set of passages 40g by an elongated axial bore which does not contain a load drop check valve. Moreover, it will be noted that passages 40e and 40g open through the surface of the plunger in the regions of narrow annular grooves or necks. These are provided to reduce the flow restriction in the regeneration path provided in the "float" position.

When "float" plunger 40a is shifted to the right to the cylinder-raising position, passages 40b and 40c provide a supply path from the Y-core to cylinder chamber 40d, passages 40e and 40f provide an exhaust path from cylinder chamber 40h to exhaust branch 41e, and passages 40g are isolated from both paths and from blind chamber 40j by the housing land between chambers 40j and 40k and the plunger lands 40l and 40m. In this position, plunger groove 40n interconnects chambers 40j and 40p so, if plunger 40a were used in an upstream valving unit, it would permit simultaneous operation of the succeeding units. When plunger 40a is shifted to the left to the cylinder-lowering position, cylinder chamber 40d is connected with exhaust branch 41d through passages 40b and 40c, chamber 40h is connected with the Y-core through passages 40e and 40f, and passages 40g are isolated by plunger lands 40l and 40m and the housing land between chambers 40d and 40k. Now, plunger groove 40n connects chamber 40j with chamber 40k. Further leftward movement brings plunger 40a to the "float" position. In this position, passages 40b and 40c still connect chamber 40d with exhaust branch 41d, passages 40e still register with chamber 40h, and plunger groove 40n still interconnects chambers 40j and 40k, but now passages 40g register with chamber 40d, and passages 40f are isolated from the Y-core by the housing land between chambers 40j and 40p. Therefore, the cylinder chambers 40d and 40h now communicate directly with each other through passages 40e and 40g and the axial bore which interconnects them. This direct interconnection of the cylinder chambers is a desirable feature, because it reduces flow resistance and thus aids in keeping the expanding end of the cylinder liquid-filled. When a direct flow path such as this is provided in the conventional parallel circuit, open center plunger valve, the "float" plunger also interconnects the Y-core and the exhaust manifold, and thereby precludes operation of the cylinders controlled by the other plungers, unless it is mounted in a special bore. In the FIG. 22 embodiment this disadvantage has been eliminated.

It will be noted that the path interconnecting the cylinder chambers in the "float" position of plunger 40a also communicates with the exhaust manifold 41 through the load drop check valve in the left end of the plunger and the radial passages 40b. Therefore, if plunger 40a controls a differential area cylinder and the load tends to contract the head end of the cylinder in the "float" position, the excess fluid returning to valve 36 (i.e., the fluid not required to keep the smaller, rod end liquid-filled) can escape to tank. However, if the cylinder must float in both directions, or in a direction to contract the smaller area rod end, this check valve will close as the volume of the larger area end of the cylinder expands, and this end will cavitate. Therefore, in these cases, valve 36 must include an anti-cavitation check valve (not shown) which permits direct flow from manifold 41 to cylinder chamber 40d, but blocks flow in the reverse direction.

Plunger 40a can be converted to a tandem circuit plunger merely by providing it with a center land similar to the land 38b on plunger 38a. It can also be adapted for use exclusively in the last unit of the valve bank by eliminating groove 40n. This last mentioned modification is desirable in cases where flexibility of location is not required because it permits use of a larger diameter axial bore in the plunger, and this effects a further reduction in the restriction to flow through the regenerative path established in the "float" position.

The control circuit for bypass valve 42 in FIG. 22 is the one shown schematically in FIG. 7 and the details of this embodiment of it will be apparent from the drawing. However, it should be noted that the command orifice 50 at the left end of "float" plunger 40a is so arranged that, as this plunger moves from cylinder-lowering position to "float" position, the orifice closes. This arrangement is desirable because it prevents the "float" plunger from loading pump 31 unnecessarily.

It will be observed that, unlike the embodiment of FIGS. 1–5, the distributing valve 36 in FIG. 22 incorporates the bypass assembly 35. Although this design increases somewhat the neutral pressure losses of the system, it is attractive because it allows the invention to be incorporated in an existing system merely by replacing the conventional distributing valve with the improved one.

*Description of the FIG. 23 embodiment*

In the embodiments of the invention discussed thus far, the bypass valve 42 discharges directly to tank 32. While this probably will be the most common arrangement, the invention can be used to real advantage in systems wherein the bypass valve discharges to a second fluid-utilization circuit. In this way, fluid not required in the first circuit can be employed to do work in the second. An example of such a system is the one used to control the steering and implement mechanisms on an earth-moving vehicle. In the conventional single pump steering-implement system, the output of the pump is fed to a priority valve which continuously delivers a predetermined rate of flow to the steering circuit and diverts the excess flow to the implement circuit. This scheme, while workable, has two important disadvantages. First, since the priority valve includes a flow metering orifice, and a fixed rate of flow always is delivered to the steering circuit even when this circuit is idle, the pressure losses in the system are relatively high. Second, since the flow delivered to the steering circuit can never be used by the implement circuit, the pump capacity must be great enough to handle simultaneously the maximum flow demands of both circuits. As this is so even though the maximum demands rarely, if ever, occur at the same time. Both of these disadvantages are avoided, while retaining the desirable flow priority characteristic, by the duplex embodiment of the present invention shown in FIG. 23.

As shown schematically in FIG. 23, the duplex system includes a primary circuit, which controls the steering mechanism (not shown) and which comprises steering cylinder 34, closed center steering valve 38, bypass valve 42 and auxiliary relief orifice 61, and a secondary circuit, which controls the implements and which includes at least one actuating cylinder 34' and associated closed center distributing valve 38', a second bypass valve 42', and an auxiliary relief orifice 61'. While I have illustrated only one cylinder and one distributing valve 38', it will be understood that the actual circuit can include several of these components, and that the distributing valves can be connected in series, in parallel or in tandem. The discharge side of bypass valve 42 is connected to the implement circuit and, as in the previous embodiments, the bypass valve 42' discharges directly to tank 32. When both of the circuits are idle, both bypass valves are open and essentially the entire output of the pump is bypassed directly to tank 32. Therefore, under this condition, pressure losses are a minimum. Actuation of steering valve 38 will cause partial or full closure of bypass valve 42 in the manner described earlier, so that a controlled portion of the output of pump 31 will be delivered to steering cylinder 34. Since the implement circuit receives only that part of the pump output which is not, at the moment, being used in the steering circuit, it should be apparent that the operator can always deliver the selected maximum flow rate to the steering cylinder, even when one of the implements is being operated. Although the full output of the pump is available for implement operation only when the steering circuit is idle and bypass valve 42 is open, this is not a real disadvantage because the need for the maximum flow rate usually does not arise while the vehicle is being turned. Since the flow requirement of the steering circuit normally is far less than that of the implement circuit, this system allows the pump 31 to be sized solely with regard to the requirements of the implement circuit.

It should be noted that, since both the steering and the implement circuit in FIG. 23 can be operated simultaneously when bypass valve 42 is in a metering or partially closed position, auxiliary orifice 61 will be effective to limit steering pressure only if the pressure in the implement circuit is lower than that in the steering circuit. In the illustrated embodiment, this relationship can be guaranteed under all conditions of simultaneous operation by so designing spring 61a' and motor 61b' that orifice 61' closes at a lower pressure than orifice 61. The same effect can be produced by connecting motor 61b' with supply passage 39 rather than passage 39', and by designing motor 61b' and spring 61a' to close orifice 61' at the same pressure that motor 61b closes orifice 61.

It also should be understood that, while the best form of the steering-implement system uses the invention in both the steering and the implement circuit, the disadvantages of the conventional system mentioned above also would be eliminated by a system similar to FIG. 23 but utilizing a conventional open center distributing valve in the implement circuit in place of valve 38' and bypass valve 42'. It also should be realized that, while the FIG. 23 embodiment employs the bypass control scheme of FIG. 6, any of the other eleven controls of FIGS. 7–17 can be used.

*Description of the FIG. 24 embodiment*

Each of the preceding embodiments of the invention employs a fixed delivery pump as the source of hydraulic fluid, and a bypass valve as the device for controlling the rate of delivery of oil to the distributing valve. Today, this is probably the most attractive form of the invention because it is relatively inexpensive. However, in systems requiring high flow rates, for example, above about 50 gallons per minute, this approach can cause serious heating problems if the controlled cylinders frequently are stalled. This is a common occurrence when the cylinders are used to operate digging implements. Each time the operator stalls a cylinder, auxiliary relief orifice 61 closes, and bypass valve 42 opens. While this action limits system pressure, and thus protects the components, the fact remains that the full output of the pump will be bypassed to tank and the pressure drop across the bypass valve will be a maximum. In large capacity systems, this relief action can cause intolerable heating of the oil, if it is repeated often enough, thereby making it necessary to install a heat exchanger. This increases space requirements, weight and cost of the system, and introduces another component which requires maintenance. In cases where heating of the oil becomes a burdensome problem, I prefer the FIG. 24 embodiment.

Referring to FIG. 24, the source comprises a variable delivery pump 31', which can be a variable displacement pump, and the means for varying the rate of delivery of fluid to the distributing valve is the delivery control element 91 of this pump. This control element 91 is positioned by a double-acting fluid pressure motor 92 which is controlled by a four-way or double-acting servo valve 93. Valve 93 is biased to its central, neutral position by a centering spring, and is shifted in opposite directions from this position by a pair of opposed motors 48 and 49 which respond to the pressures at the output junctions 46 and 47, respectively, of the Wheatstone bridge. As in the FIG. 1 embodiment, the command leg 51 of the bridge includes a pair of parallel connected command orifices 55 and 56, which are normally closed, and a normally open auxiliary orifice 61. In this embodiment, the orifice 61 performs a discharge pressure compensating function rather than a relief function. As a safety precaution, the system also includes a high pressure relief valve 94. The feedback leg 52 of the Wheatstone bridge contains a variable orifice 57 whose flow area varies with the position of delivery control element 91, and which is closed when the latter is in its minimum delivery position. Although the arrangement of the bridge illustrated in FIG. 24 is analogous to the one shown in FIG. 8, it will be understood that any of the twelve schemes shown in FIGS. 6–17 may be used.

Inasmuch as the mechanism for positioning the displacement control element 91 in FIG. 24 is operated by pressures derived from the pressure in supply passage 39, it is essential here, just as in FIG. 1, that the system maintain a minimum supply pressure adequate to initiate actuation of the delivery control mechanism. This function is performed by a valving device 95 which includes feedback orifice 57 and which is operated by motor 92, and by a restricted vent path 96. Valving device 95 is so designed that, when the control element 91 reaches a minimum delivery position in which the discharge rate of pump 31' is low but still greater than zero, orifice 57 is closed and the restricted vent path 96 is opened. With this arrangement, the Wheatstone bridge control is precluded from reducing pump delivery rate to zero, and the small quantity of fluid passing to tank 32 through vent passage 96 maintains the required minimum backpressure in passage 39. Preferably the restriction in passage 96 is defined by a low pressure relief valve 97 which is adjusted to crack at the preselected minimum supply pressure.

When one of the valving units 37 or 38 is shifted away from its neutral position, the associated command orifice 55 or 56 is opened, and the Wheatstone bridge is unbalanced. This raises the pressure at output junction 47 and causes motor 49 to shift servo valve 93 to a position in which the head and rod ends of motor 92 are pressurized and vented, respectively. As a result, motor 92 moves delivery control element 91 in the delivery-increasing direction. Simultaneously, valving device 95 interrupts flow through restricted vent passage 96 and commences to open feedback orifice 57. Opening of orifice 57 raises the pressure at output junction 46 and tends to restore the bridge to a balanced condition. When that condition is achieved, valve 93 will be returned to neutral position by its centering spring and motor 48, and control element 91 and valving device 95 will come to rest. The position of element 91, and consequently the delivery rate of pump 31', will correspond to the position of the actuated valving unit 37 or 38, and this correspondence will be maintained throughout the range of movement of the valving unit just as in the case of the bypass valve embodiment of FIG. 1.

As long as the supply pressure in passage 39 is below a preselected maximum, spring 61a will hold auxiliary orifice 61 open, and the controls will continue to maintain a substantially proportional relationship between the position of delivery control element 91 and the position of the actuated valving unit 37 or 38. However, if the load acting on the cylinder is of such magnitude that supply pressure exceeds this maximum value, motor 61b will commence to close orifice 61 and reduce the pressure at output junction 47. This will cause motor 48 to shift valve 93 to the right to the position in which it pressurizes and vents, respectively, the rod and head ends of motor 92. As a result, motor 92 will move element 91 in the delivery-reducing direction and reduce the flow area of feedback orifice 57. When the change in the pressure at output junction 46 effected by closure of orifice 57 restores the bridge to a balanced condition, valve 93 will move back to its neutral position, and control element 91 will come to rest. The magnitude of the load acting on the actuated cylinder will determine how far element 91 is moved in the delivery-reducing direction, and, in cases where the cylinder stalls, this element will move to a small delivery position in which the output of the pump is just sufficient to make up for system leakage and to maintain system pressure at the setting of orifice 61. If the system is very tight, control element 91 could move all the way to the minimum delivery position wherein valving device 95 reopens restricted vent passage 96 and closes feedback orifice 57. However, since opening of passage 96 effects an immediate decrease in the supply pressure, spring 61a could then reopen orifice 61 and cause the controls to increase the delivery rate of pump 31' and again close passage 96. Thus, in this case, the controls will cycle element 91 back and forth about a delivery position very close to the minimum position as long as the valving unit 37 or 38 is held in an actuated position and the controlled cylinder remains stalled. In either case, it will be appreciated that, since the delivery rate of the pump 31' is reduced to a small value under stalling conditions, the losses due to heating of the oil will also be small.

After the excessive load abates, and supply pressure reduces below the selected maximum, spring 61a will reopen orifice 61 and thereby cause the pressure at output junction 47 to increase relatively to the pressure at junction 46. Now, as in the FIG. 1 embodiment, the controls will increase the rate of delivery of oil to the distributing valve to the level dictated by the present position of the actuated valving unit 37 or 38. On the other hand, if the operator returns the valving unit to neutral position while the associated cylinder is stalled, flow through bridge leg 51 will be interrupted and the pressure at junction 47 will decrease to tank pressure. In this case, the controls will move element 91 to, and hold it in, its minimum delivery position.

It should be noted that, since restricted passage 96 is closed as soon as delivery control element 91 moves away from its minimum delivery position, the supply pressure will immediately rise to the setting of auxiliary orifice 61 unless the actuated valving unit 37 or 38 has already opened a flow path to one of the controlled cylinders. Since creation of this pressure pulse obviously is undesirable, the timing of the valving units 37 and 38 should be so selected that each opens a flow path to the cylinder before it commences to open the associated command orifice and causes the controls to increase pump delivery. Aside from this, the valving units used in the FIG. 24 embodiment of the invention can be the same as those used in FIG. 1.

Description of the FIG. 25 embodiment

In all of the embodiments described above, including those which use a fixed delivery pump as well as those which use a variable delivery pump, the variable command orifice 55 or 56 is defined by a portion of the main valving unit itself, and its flow area is automatically changed as the valving unit it moved. This arrangement probably is the most useful one, but there are installations, particularly those requiring high flow rates, where definite advantages can be realized by incorporating the command orifices for the delivery control bridge in separate pilot valves which also serve to control the positions of the main valving units. One system of this type is shown schematically in FIG. 25.

As shown in FIG. 25, the system includes two identical valving units 37 and 38 which are connected in a parallel circuit and each of which includes a main valve 98 or 98a and a pilot valve 99 or 99a. The command orifices 55 and 56, which form part of the control bridge for bypass valve 42, are defined by specially shaped, longitudinal grooves in the peripheries of the plungers 101 and 101a of pilot valves 99 and 99a, respectively, and are arranged in series with each other in the command leg 51 of the bridge. The bridge control circuit is the one shown in FIG. 13. As in the case of the command orifice 56 of FIGS. 1, 3 and 22, the command orifices 55 and 56 are actually defined by two portions of the associated plunger, one portion being effective when the plunger is shifted in one direction from the illustrated neutral position and the other being effective when the plunger is shifted in the opposite direction from neutral. The two main valves 98 and 98a are of the double-acting type, and each has a plunger 102 or 102a which, in the neutral position, isolates the cylinder chambers 103 and 104 or 103a and 104a from each other and from the other fluid-containing spaces of the distributing valve, and blocks communication between pump 31 and tank 32. When plunger 102 is shifted to the right from neutral position, land 105 opens communication between supply chamber 106 and cylinder chamber 104, and land 107 opens communication between exhaust chamber 108 and cylinder chamber 103. Leftward movement of plunger 102 causes land 107 to open a flow path from supply chamber 109 to cylinder chamber 103, and causes land 105 to open a vent path between cylinder chamber 104 and exhaust chamber 111. Movement of plunger 102a in opposite directions from its neutral position causes lands 105a and 107a to establish similar flow paths between the corresponding chambers 103a, 104a, 106a, 108a, 109a and 111a.

Main plunger 102 is biased to its neutral position by a centering spring 112 and is shifted in opposite directions from this position by a pair of opposed piloted motors 113 and 114 located at its opposite ends. These motors respond to the pressures at the common output junctions of a pair of secondary hydraulic Wheatstone bridges whose input junctions are connected, respectively, with supply chamber 109 and tank 32. One of these secondary bridges controls leftward movement of plunger 102 from its neutral position and comprises conduit legs 115 and 116 which connect motors 113 and 114, respectively, with the supply passage and which contain fixed reference orifices 117 and 118, conduit leg 119 which connects motor 113 with tank 32 and contains a variable command orifice 121 controlled by pilot plunger 101, and a conduit leg 122 which connects motor 114 with tank 32 and which contains a variable feedback orifice 123 controlled by main plunger 102. The other secondary bridge controls rightward movement of main plunger 102 and comprises the legs 115 and 116 of the first mentioned secondary bridge, a conduit leg 124 which connects motor 114 with tank 32 and contains a variable command orifice 125 controlled by pilot plunger 101, and a conduit leg 126 which connects motor 113 with tank 32 and contains a variable feedback orifice 127 controlled by main plunger 102. Command orifices 121 and 125 are so arranged that both are closed when pilot plunger 101 is in neutral position, that orifice 121 opens progressively and orifice 125 remains closed as plunger 101 moves to the left, and that orifice 125 opens progressively and orifice 121 remains closed as plunger 101 moves to the right. The feedback orifices 123 and 127 are arranged in a similar manner; the orifice 123 opening only when plunger 102 is shifted to the left from neutral position, and the orifice 127 opening only when plunger 102 moves to the right from that position.

It should be observed that the command legs 119 and 124 of the secondary bridges contain shut-off valves 128 and 129, respectively, each of which is urged closed by the pressure in one or the other of the cylinder chambers 103 and 104, and both of which are urged open by supply pressure. Shut-off valve 128 serves to prevent flow from motor 113 to tank 32 through leg 119 whenever the pressure in cylinder chamber 103 is greater than supply pressure, and valve 129 performs a similar function with respect to motor 114 whenever the pressure in cylinder chamber 104 is greater than supply pressure. Thus, as will be apparent from the description of operation, each of these valves 128 and 129 has the effect of a conventional load drop check valve in that it causes the associated cylinder chamber to be isolated from the supply passage when supply pressure is insufficient to either hold or move the load. Since valving unit 38 is identical to unit 37, its parts are identified by the same reference numerals, except for the addition of the postscript a. Although it is not illustrated, it will be understood that the FIG. 25 system includes an auxiliary relief orifice 61 arranged as shown in FIG. 20.

When the FIG. 25 system is first put in operation, the valving units 37 and 38 will be in their illustrated neutral positions, and the primary command orifices 55 and 56 will be open. Consequently, the pressure at output junction 47 of the primary bridge will rise, and motor 49 will shift bypass valve 42 to the left from the illustrated position. This opens an unloading path from pump 31 to tank 32, and reduces the backpressure on the pump to the minimum level required for operation of the controls.

When the operator wishes to extend cylinder 33, he shifts pilot plunger 101 to the right to reduce the flow area of primary command orifice 55 and to increase the flow area of secondary command orifice 125. The change in the area of orifice 55 reduces the pressure at junction 47 relative to the pressure at junction 46, and causes motor 48 to move bypass valve 42 in the closing direction. This action increases supply pressure. When supply pressure exceeds the load pressure in the head end of cylinder 33, shut-off valve 129 shifts to the left and opens bridge leg 124. Since orifice 125 is already open, at least partially, the pressure in motor 114 immediately decreases relatively to the pressure in motor 113, and main plunger 102 shifts to the right against the opposition of centering spring 112. As the plunger moves to the right, land 105 opens a supply path from chamber 106 to cylinder chamber 104, and land 107 opens a vent path from cylinder chamber 103 to exhaust chamber 108. Simultaneously, feedback orifice 127 opens, and the pressure in motor 113 decreases relatively to the pressure in motor 114. When the combined effect of the change in pressure in motor 113 and the increase in the force exerted by spring 112 offsets the change in pressure in motor 114 attributable to opening of orifice 125, the secondary bridge will again be balanced and plunger 102 will come to rest. Thus, it will be evident that the positions of both main plunger 102 and bypass valve 42 will correspond substantially to the position of pilot plunger 101. Therefore, as plunger 101 is moved further to the right, cylinder 33 will move faster and, as plunger 101 is moved back toward neutral position, cylinder 33 will move slower.

If pilot plunger 101 is moved full stroke, i.e., to its limiting right-hand position, its land 131 will close bridge leg 126 and interrupt flow from motor 113 to tank 32. As a result, the pressure in motor 113 will rise to the prevailing supply pressure, and this motor will shift main plunger 102 to its limiting right-hand position. Therefore, even if main plunger 102 does not follow exactly the movement of pilot plunger 101, the main valve will be fully open when the operator moves pilot plunger 101 full stroke. Closure of bridge leg 125 by land 131 also is a desirable feature because it reduces flow losses through the secondary bridge at times when the operator is calling for a maximum rate of delivery to the cylinder 33. A further reduction in flow losses is effected by main plunger 102 itself in that, as it moves to its limiting position, its land 132 isolates bridge leg 116 from motor 114 and thereby closes the other flow path through the secondary bridge. Thus, it will be seen that, in the illustrated embodiment, all flow through both the primary bridge and the secondary bridge is interrupted when pilot plunger 101 is moved full stroke.

As the operator allows pilot plunger 101 to return to its neutral position, command orifice 55 opens, and command orifice 125 closes. This causes motor 49 to commence to reopen bypass valve 42, and causes motor 114 and spring 112 to commence to move main plunger 102 back to its neutral position. As a result, the rate of movement of cylinder 33 decreases. When bypass valve 42 opens far enough to reduce supply pressure below the load pressure in cylinder chamber 104, shut-off valve 129 will close and interrupt flow from motor 114 to tank 32 through bridge leg 124. As a result, the pressure in motor 114 will increase and the motor will shift main plunger 102 back to its neutral position. When pilot plunger 101 reaches its neutral position, bypass valve 42 will be open, and pump 31 will be unloaded, and main plunger 102 will be in the neutral position.

Movement of pilot plunger 101 to the left from neutral position reduces the flow area of orifice 55 and increases the flow area of orifice 121. This causes motor 48 to move bypass valve 42 in the closing direction, and causes motor 114 to move main plunger 102 to the left from its neutral position (assuming that bypass valve 42 has closed far enough to raise supply pressure to the level required to open shut-off valve 128). Land 107 now opens a supply path from chamber 109 to chamber 103 and the rod end of cylinder 33, and the land 105 opens an exhaust path from the head end of the cylinder and chamber 104 to exhaust chamber 111. As in the case of rightward movement of plunger 101, the positions of valve 42 and plunger 102 will correspond to the position of pilot plunger 101. When the latter is shifted full stroke to the left, its land 133 closes secondary bridge leg 122 and thereby prevents flow from motor 114 to tank 32. This raises the pressure in motor 114 and causes it to move main plunger 102 full stroke. When the plunger reaches its limiting position, land 134 interrupts flow into motor 113 from bridge leg 115. Thus, as in the case of rightward movement of the pilot plunger 101, main plunger 102 will move full stroke when pilot plunger 101 is moved full stroke, and, in this limiting position, all flow paths through the primary and secondary bridges are closed.

When pilot plunger 101 is returned to its neutral position, it closes orifice 121 and reopens orifice 55. Therefore, bypass valve 42 reopens, and motor 113 shifts main plunger 102 back to neutral position. After bypass valve 42 reduces supply pressure below the load pressure in chamber 103, shut-off valve 128 will close, the pressure in motor 113 will rise to the level of the supply pressure, and main plunger 102 will be forced to its neutral position. When pilot plunger 101 reaches its neutral position, main plunger 102 will be in its neutral position, and bypass valve 42 will be fully open.

Cylinder 34 is actuated by movement of pilot plunger 101a and the mode of operation is exactly the same as for cylinder 33. If both of the pilot plungers 101 and 101a are shifted away from their neutral positions, cylinders 33 and 34 will be operated simultaneously, since the two valving units 37 and 38 are connected in a parallel flow circuit. In this case, of course, the position of bypass valve 42 will be determined by joint action of command orifices 55 and 56 and, if either of these orifices is closed, the bypass valve will close.

The FIG. 25 embodiment affords the following distinct advantages which deserve special comment:

(A) The twin bridge circuit used to control the position of each main valve facilitates incorporation of the shut-off valves, and also provides a positive and repeatable neutral position for the main valve. While each main valve could be controlled by a single bridge, having one variable command orifice and one variable feedback orifice, this arrangement provides only an impositive neutral position for the main valve because both of the variable orifices would have to be partially open in the neutral positions of the main and pilot valves. Unless the two flow paths through the bridge were precisely matched, it would be impossible to guarantee that the two valves would assume their neutral positions at the same time. Moreover, even if the bridge were carefully designed and fabricated, still the main valve would not necessarily return to its neutral position when the operator released the pilot plunger unless the system also included some means for insuring that the pilot plunger would always return to its exact neutral position. These problems are eliminated by the twin bridge arrangement because its variable orifices are closed, and slightly overlapped, when the plungers are in, or close to, their neutral position. Another disadvantage of the single bridge type of control is that it complicates considerably incorporation of the shut-off valves.

(B) The use of shut-off valves 128, 128a, 129 and 129a in the piloting circuits eliminates the need for load drop check valves while preserving the function of those valves. This simplifies the design of the main valves and, in large size units, i.e., those handling flow rates above 70 gallons per minute, it may result in an over-all cost saving.

(C) The operator effort required to operate the cylinders is much less than in a conventional system because the operator need shift only the small pilot plungers 101 and 101a.

(D) Since the pilot plungers 101 and 101a do not control directly the flow paths to and from the cylinders, they do not have the normal deadband required to effect adequate seals at the cylinder chambers in the neutral position. Therefore, these plungers can have a longer metering stroke and a shorter total stroke than the conventional distributing valve.

(E) The pilot valves can be designed as separate units which either are bolted onto the housing containing the main plungers or are located at a remote station. This makes it possible to use the same pilot valve for main valves of different sizes, and also gives remote control capability.

(F) Since the pilot valves are small and handle only low rates of flow, the flow forces acting on them are small. Because of this, it is an easy matter to provide a pneumatic or electric remote control actuation system for them.

(G) Since the flow paths through the secondary bridges of each valving unit in the illustrated embodiment are closed when the main plunger is shifted full stroke, the use of the piloting scheme does not entail any flow losses at times when maximum delivery rate is required.

*Description of the embodiment of FIGURES 26–28*

The piloting scheme used in FIG. 25 may be employed in a versatile valve of the type shown in FIG. 22, which affords a tandem or a parallel flow circuit depending upon which of two plunger designs is used. Such a valve is illustrated in FIGS. 26–28. As shown in these figures, the distributing valve 36 contains the two valving units 37 and 38 as well as the bypass valve assembly 35 and the shut-off valves 128, 128a, 129 and 129a. The supply passage 39 in the housing of valve 36 includes an inlet port 39c and a Y-shaped center core, and the exhaust passage 41 is a cored manifold having parallel branches 41d and 41e and a port 41c. The two main plungers 102 and 102a can be identical, but, for purposes of illustration, the drawing shows plunger 102 as a tandem plunger and plunger 102a as a parallel plunger. The only difference between these two designs is the addition to plunger 102 of a center land 135. When plunger 102 is shifted in opposite directions from the illustrated neutral position, land 135 and one of the lands 105 and 107 will interrupt communication between chamber 106 and the supply chambers 109 and 109', and thereby close the Y-core supply path to the succeeding plungers in the valve bank. During rightward movement of plunger 102, land 105 progressively opens a supply path from chamber 109' to cylinder chamber 104 through center neck 136, and land 107 progressively opens an exhaust path from cylinder chamber 103 to manifold branch 41d through the outer plunger neck 137. During leftward movement, center neck 138 defines a supply path to cylinder chamber 103, and outer neck 139 defines an exhaust path from chamber 104. Parallel plunger 102a operates in essentially the same way as plunger 102 except that, since it has no center land, it is incapable of blocking flow through the Y-core.

In the embodiment of FIGS. 26–28, the pilot plungers 101 and 101a, and the auxiliary relief orifice 61 are mounted in a separate housing 141 which is bolted to the housing of the distributing valve. The command leg 51 of the primary bridge, which contains orifices 55 and 56, is defined by a snake core which runs through housing 141. The leading end of this core is connected with the Y-shaped supply passage 39 at a point upstream of the main plungers by a passage 142, and the exit end terminates at a port which is connected by external piping 143 with the chamber 47 at the left end of bypass valve 42. This chamber, which constitutes one of the output junctions of the primary bridge and also serves as the working space of motor 49, is connected with the tank through a path including axial and radial passages 144 and 145 in bypass valve 42, and exhaust manifold branch 41d. This path constitutes bridge leg 54 and contains an orifice plug that defines fixed orifice 59. The feedback leg of the primary bridge includes the orifice-defining, longitudinal groove 57 which is formed in bypass valve 42 and is arranged to connect supply passage 39 directly with the chamber 46 at the right end of this valve as the valve opens. This chamber, in turn, is connected with the tank through the orifice plug 58, the passages 144 and 145 in bypass valve 42, and exhaust manifold 41.

The legs 115, 116, 119, 122, 124 and 126 of the secondary bridges shown schematically in FIG. 25 have the following counterparts in the embodiment of FIGS. 26–28:

Leg 115—defined by passage 146 (see FIG. 27) which intersects passage 142 and is connected through it with supply passage 39, bore 147 which receives shut-off valves 128 and 129, axial and radial passages 148 and 149 in shut-off valve 128, and drilled passages 151–153 which lead into motor 113. The radial passage 149 in valve 128 constitutes fixed orifice 117 of FIG. 25.

Leg 116—defined by passage 146, bore 147, axial and radial passages 154 and 155, respectively, in shut-off valve 129, and drilled passages 156–158. The radial passage 155 constitutes the fixed orifice 118 of FIG. 25.

Leg 119—defined by drilled passages 151–153, shut-off valve 128, drilled passage 159, chamber 161, secondary command orifice 121, exhaust core 162, drilled passage 163 and exhaust manifold branch 41d.

Leg 122—defined by variable feedback orifice 123 formed in plunger 102 and exhaust manifold branch 41e.

Leg 124—defined by drilled passages 156–158, shut-off valve 129, drilled passage 164, chamber 165, secondary command orifice 125, exhaust core 166, drilled passage 167, and exhaust manifold branch 41e.

Leg 126—defined by variable feedback orifice 127 formed in plunger 102, and exhaust manifold branch 41d.

Although portions of the piloting circuit for main plunger 102a are not shown in FIGS. 26–28, it will be understood that this circuit is identical to that provided for main plunger 102.

The relief circuit in this embodiment is the one shown in FIG. 20, so auxiliary orifice 61 is located in a shunt path around command orifices 55 and 56. Referring to FIG. 28, the shunt path includes axial and radial passages 168 and 169 in orifice-defining spool 61, and a passage indicated at 171 which leads directly into the chamber 47 at the left end of bypass valve 42. The auxiliary orifice is normally closed but, when the pressure in supply passage 39 rises to the desired maximum, spool 61 shifts to the left and progressively opens communication between radial passage 169 and passage 171.

The controls in the embodiment of FIGS. 26–28 operate in the same way as their counterparts in FIG. 25, except for one difference. In FIG. 25, it will be recalled, the feedback legs 122 and 126 of the secondary bridges pass through pilot valve 99 and are blocked by lands 133 and 131, respectively, when plunger 101 is shifted full stroke in one or the other direction. This feature reduces flow losses under certain conditions, but the main and pilot plungers must be lengthened in order to include it. I believe the saving in plunger length normally would be more important than the reduction in flow losses, and therefore have omitted the feature from the present embodiment.

It should be understood that, while the embodiments of FIGS. 25–28 use the control scheme of FIG. 13 for the bypass valve, any of the twelve controls could be used. It should also be understood that the piloting scheme for the main plungers could also be used in the variable delivery pump embodiment of FIG. 24.

While I have described herein various embodiments of my inventive concept, it should be understood that the following claims provide a real measure of the scope of the invention.

I claim:
1. In combination
 (a) a source (31 or 31') of hydraulic fluid under pressure and a reservoir (32);
 (b) closed center distributing valve means (36) for controlling a hydraulic motor, the valve means including a control member (e.g. 65, 37a or 101) having a neutral position in which it causes the motor to be isolated from the source and being movable from that position to effect progressive opening of a flow path between the source and the motor;
 (c) control means (42 or 91–93) for varying the rate at which the source delivers fluid to the distributing valve means;
 (d) a balanced hydraulic Wheatstone bridge including a pair of input junctions (44, 45) connected, respectively, with the source and the reservoir, a pair of output junctions (46, 47), and four conduit legs (51–54) which interconnect the junctions and each of which contains a metering orifice (e.g. 55, 57, 58, 59);
 (e) one (55) of said orifices, termed the command orifice, affording a flow area which varies in response to movement of the control member and serving to unbalance the bridge, and another (57) of said orifices, termed the feedback orifice, affording a flow area which varies in response to movement of the control means and serving to rebalance the bridge;
 (f) actuating means (48, 49) responsive to the pressures at the output junctions (46, 47) for operating the control means; and

(g) means (e.g. 42, 43 or 95, 96, 97) for maintaining a minimum loading pressure on the source when the latter is delivering fluid at a minimum rate to the distributing valve means, the minimum pressure being adequate to enable the actuation means to operate the control means.

2. The combination defined in claim 1 in which
   (a) the source includes a fixed delivery pump (31); and
   (b) the control means comprises a bypass valve (42) which is adapted to open and close progressively an unloading path betwen the pump and the reservoir.

3. The combination defined in claim 2 in which the bypass valve is spring biased to a position in which is closes the unloading path between the pump and the reservoir, whereby the bypass valve also serves as the means for maintaining a minimum loading pressure.

4. The combination defined in claim 2 in which the means for maintaining a minimum loading pressure comprises a relief valve located in said unloading path downstream of the bypass valve.

5. The combination defined in claim 1 in which
   (a) the source includes a variable delivery pump (31′); and
   (b) the control means comprises means (91–93) for varying the delivery rate of the pump.

6. The combination defined in claim 5 in which the means for maintaining a minimum loading pressure comprises
   (a) a vent path (96) leading from the pump to the reservoir and containing a relief valve (97);
   (b) valve means (95) for opening and closing the vent path, respectively, when the delivery rate of the pump is below and above a predetermined minimum greater than zero; and
   (c) means (95, 57) for preventing the control means from reducing the delivery rate of the pump below said predetermined minimum.

7. The combination defined in claim 5 in which the means for varying the delivery rate of the pump comprises
   (a) a delivery control element (91) associated with the pump and movable between minimum and maximum delivery positions;
   (b) a control motor (92) for shifting the delivery control element;
   (c) a control valve (93) operated by the actuating means and serving to control flow to the control motor from the pump as well as flow from the control motor to the reservoir, the control valve having a neutral position toward which it is biased and in which it hydraulically locks the control motor; and
   (d) means (95) operated by the control motor for varying the flow area of the feedback orifice.

8. The combination defined in claim 7 in which the means for maintaining a minimum loading pressure comprises
   (a) a vent path (96) leading from the pump to the reservoir and containing a relief valve (97);
   (b) valve means (95) operated by the control motor for opening the vent path when the delivery control element is a minimum delivery position in which the rate of delivery is greater than zero, and for closing the vent path when the delivery control element is in a greater delivery position; and
   (c) means (95) operated by the control motor for manipulating the feedback orifice so as to balance the Wheatstone bridge when the displacement control element is in said minimum delivery position.

9. The combination defined in claim 1 in which the flow area of the command orifice (55) is a minimum when said control member is in neutral position; and which includes
   (a) an auxiliary metering orifice (61) of the variable type in series with, and in the same leg of the Wheatstone bridge as, the command orifice; and
   (b) means (61a, 61b) for varying the flow area of the auxiliary orifice in inverse relation to the pressure imposed on the source at least when that pressure is above a certain preselected value.

10. The combination defined in claim 1 in which the flow area of the command orifice is a maximum when said control member is in neutral position; and which includes
   (a) an auxiliary metering orifice (61) of the variable type connected with the leg of the Wheatstone bridge containing the command orifice in parallel with the command orifice; and
   (b) means (61a, 61b) for varying the flow area of the auxiliary orifice directly in accordance with the pressure imposed on the source at least when that pressure is above a certain preselected value.

11. The combination defined in claim 1 in which
   (a) the distributing valve means (36) includes a plurality of valving units (e.g. 37 and 38), each of which controls a hydraulic motor and includes one of said control members (65 or 74);
   (b) the leg (51) of the Wheatstone bridge containing said command orifice (55) comprises parallel branches (51b, 51c) containing additional command orifices (e.g. 56), there being one command orifice for each valving unit; and
   (c) in which each command orifice is closed when the associated control member is in said neutral position.

12. The combination defined in claim 11 which includes
   (a) a variable auxiliary metering orifice (61) located in said leg (51) containing the command orifices (55, 56) and arranged in series with those parallel-connected orifices;
   (b) spring means (61a) biasing the auxiliary orifice open; and
   (c) means (61b) responsive to the pressure imposed on the source for progressively reducing the flow area of the auxiliary orifice as that pressure rises above a certain value.

13. The combination defined in claim 11 in which
   (a) the command orifices (55 and 56) are in a leg of the Wheatstone bridge which joins an output junction (47) with the input junction (44) connected with the source; and
   (b) the feedback orifice (57) is so arranged that its flow area decreases as the control means increases the rate of delivery of fluid to the distributing valve means.

14. The combination defined in claim 11 in which
   (a) the command orifices are in a leg of the Wheatstone bridge which joins an output junction (47) with the input junction (44) connected with the source; and
   (b) the feedback orifice (57) is so arranged that its flow area increases as the control means increases the rate of delivery of fluid to the distributing valve means.

15. The combination defined in claim 11 in which
   (a) the command orifices are in a leg of the Wheatstone bridge which joins an output junction (47) with the input junction (45) connected with the reservoir; and
   (b) the feedback orifice (57) is so arranged that its flow area decreases as the control means increases the rate of delivery of fluid to the distributing valve means.

16. The combination defined in claim 11 in which
   (a) the command orifices are in a leg of the Wheatstone bridge which joins an output junction (47) with the input junction (45) connected with the reservoir; and
   (b) the feedback orifice (57) is so arranged that its flow area increases as the control means increases the rate of delivery of fluid to the distributing valve means.

17. The combination defined in claim 1 in which
(a) the distributing valve means includes a plurality of valving units (37, 38), each of which controls a hydraulic motor and includes one of said control members (101, 101a);
(b) the leg (51) of the Wheatstone bridge containing said command orifice (55) also includes an additional command orifice (56) for each of said valving units, the various command orifices being arranged in series in the leg; and
(c) in which each command orifice is open when the associated control member is in said neutral position.

18. The combination defined in claim 17 which includes
(a) a variable auxiliary metering orifice (61) connected with the leg containing the command orifices and arranged in parallel with the series of command orifices;
(b) spring means (61a) biasing the auxiliary orifice closed; and
(c) means (61b) responsibe to the pressure imposed on the source for progressively increasing the flow area of the auxiliary orifice as that pressure rises above a certain value.

19. The combination defined in claim 18 in which
(a) the command orifices (55, 56) are in a leg of the Wheatstone bridge which joins an output junction (47) with the input junction (44) connected with the source; and
(b) the feedback orifice (57) is so arranged that its flow area decreases as the control means increases the rate of delivery of fluid to the distributing valve means.

20. The combination defined in claim 18 in which
(a) the command orifices (55, 56) are in a leg of the Wheatstone bridge which joins an output junction (47) with the input junction (45) connected with the reservoir; and
(b) the feedback orifice (57) is so arranged that its flow area decreases as the control means increases the rate of delivery of fluid to the distributing valve means.

21. The combination defined in claim 1 in which the distributing valve means comprises
(a) a main valve (98) having supply (106, 109) and motor (103) passages connected, respectively, with the source and the hydraulic motor, and a valving element (102) movable in at least one direction from a neutral position, in which it isolates these passages from one another, to open a flow path from the supply passage to the motor passage;
(b) spring means (112) biasing the main valve to neutral position;
(c) a second balanced hydraulic Wheatstone bridge (115, 116, 119, 122) of the type described in clause (d) of claim 1;
(d) means (113, 114) responsive to the pressures at the output junctions of the second bridge for shifting the valving element of the main valve; and
(e) a pilot valve (101) which constitutes said control member and which is shiftable in at least one direction from a neutral position, in which the two bridges are balanced, to progressively change the flow areas of the command orifices (55, 121) of the two bridges and thereby unbalance the bridges; and
(f) in which the flow area of the feedback orifice (123) of the second bridge varies in response to movement of the valving element (102) of the main valve (98).

22. The combination defined in claim 21 which includes a shut-off valve (128) which responds to the pressures in the supply (106, 109) and motor (103) passages and which interrupts flow from the source through the leg (119) of the second bridge containing the command orifice (121) whenever the pressure in the motor passage exceeds the pressure in the supply passage.

23. The combination defined in claim 21 in which
(a) the pilot valve (101) and the valving element (102) of the main valve close the command (121) and feedback (123) orifices, respectively, of the second bridge as they move toward their neutral positions;
(b) the pilot valve (101) has a limiting position in its said one direction of movement in which it interrupts flow to the reservoir through the leg (122) of the second bridge containing the feedback orifice (123); and
(c) the valving element (102) of the main valve has a limiting position in its said one direction of movement in which it interrupts flow from the source through the leg (119) of the second bridge containing the command orifice (121).

24. The combination defined in claim 1 in which the distributing valve means comprises
(a) a main valve (98) having supply (106, 109), exhaust (108) and motor (103) passage means connected, respectively, with the source (31), the reservoir (32) and the hydraulic motor (33), and a valving element (102) movable in opposite directions from a neutral position in which it isolates these passage means from one another, movement of the valving element toward a second position serving to open a flow path from the supply passage means to the motor passage means and movement in the opposite direction toward a third position serving to open a flow path from the motor passage means to the exhaust passage means;
(b) centering spring means (112) biasing the valving element (102) toward the neutral position;
(c) second (115, 116, 119, 122) and third (115, 116, 124, 126) balanced hydraulic Wheatstone bridges of the type described in clause (d) of claim 1;
(d) means (113, 114) responsive to the pressures at the output junctions of the second bridge for shifting the valving element back and forth between the neutral position and the second position;
(e) means (113, 114) responsive to the pressures at the output junctions of the third bridge for shifting the valving element back and forth between the neutral position and the third position; and
(f) a pilot valve (101) which constitutes said control member and which is shiftable in opposite directions from a neutral position in which the three bridges are balanced, movement of the pilot valve in a first direction serving to vary progressively the flow areas of the command orifices (55, 121) of the first and second bridges and thereby unbalance these bridges, and movement in the second direction serving at least to vary progressively the flow area of the command orifice (125) of the third bridge and thereby unbalance this bridge, and
(g) in which the flow area of the feedback orifice (123) of the second bridge varies as the valving element (102) moves between the neutral and second positions, and the flow area of the feedback orifice (127) of the third bridge varies as the valving element moves between the neutral and third positions.

25. The combination defined in claim 24 in which
(a) the second and third bridges have common output junctions; and
(b) the means of clauses (d) and (e) comprise a single pair of opposed hydraulic motors (113, 114), one of the motors being in communication with one of the common output junctions, and the other of the motors being in communication with the other common output junction.

26. The combination defined in claim 24 in which
(a) the pilot valve (101) and the valving element (102) of the main valve close the command (121, 125)

and feedback (123, 127) orifices, respectively, of both the second and third bridges when they are in their neutral position;
(b) the pilot valve (101) has a limiting position in said first direction of movement in which it interrupts flow to the reservoir through the leg (122) of the second bridge containing the feedback orifice (123), and a limiting position in said second direction of movement in which it interrupts flow to the reservoir through the leg (126) of the third bridge containing the feedback orifice (127); and
(c) the valving element (102) of the main valve interrupts flow from the source through the leg (119) of the second bridge containing the command orifice (121) when that element is in said second position, and interrupts flow from the source through the leg (124) of the third bridge containing the command orifice (125) when that element is in said third position.

27. The combination defined in claim 24 in which
(a) the main valve (98) has second motor passage means (104) which is connected with the exhaust passage means (111) when the valving element (102) moves from neutral position toward said second position, and which is connected with the supply passage means (106) when the valving element (102) moves from neutral position toward said third position; and
(b) which includes a shut-off valve (128) which responds to the pressures in the supply (106, 109) and first motor (103) passage means and which interrupts flow from the source through the leg (119) of the second bridge containing the command orifice (121) whenever the pressure in the first motor passage means exceeds the pressure in the supply passage means.

28. The combination defined in claim 27 which includes a second shut-off valve (129) which responds to the pressures in the supply (106, 109) and second motor (104) passage means and which interrupts flow from the source through the leg (124) of the third bridge containing the command orifice (125) whenever the pressure in the second motor passage means exceeds the pressures in the supply passage means.

29. The combination defined in claim 1 in which
(a) the source comprises a fixed delivery pump (31), and the control means comprises a bypass valve (42) which opens and closes progressively a flow path between the pump and a bypass conduit; and
(b) which includes a second fluid-utilization circuit (34', 38', 39', 42') which is connected to receive fluid through the bypass conduit.

30. The combination defined in claim 1 in which the source includes a fixed delivery pump (31) and the control means comprises a bypass valve (42) which opens and closes progressively a flow path between the pump and a bypass conduit; and which includes
(a) a second closed center distributing valve means (38') having supply passage means (39') connected with the bypass conduit, motor passage means, and a control member having a neutral position in which it causes the motor passage means to be isolated from the supply passage means and being movable from that position to effect progressive opening of a flow path between these passage means;
(b) a second bypass valve (42') which opens and closes progressively a flow path between the bypass conduit and the reservoir (32);
(c) a second balanced hydraulic Wheatstone bridge (51', 52', 53', 54') of the type described in clause (d) of claim 1 but having its input junctions (44', 45') connected, respectively, with the bypass conduit and the reservoir;
(d) the flow area of the command orifice (56') of the second bridge varying in response to movement of the control member of the second distributing valve means to thereby unbalance this bridge, and the flow area of the feedback orifice (57') of the second bridge varying in response to movement of the second bypass valve (42') to thereby rebalance the bridge;
(e) second actuating means (48', 49') responsive to the pressures at the output junctions (46', 47') of the second bridge for shifting the second bypass valve (42'); and
(f) means (43') for maintaining a minimum pressure in the bypass conduit when both bypass valves (42, 42') are open, this minimum pressure being adequate to enable the actuating means (48', 49') to shift the second bypass valve.

31. The combination defined in claim 30 which includes
(a) a first auxiliary orifice device (61, 61a, 61b) associated with the command leg (51) of the first bridge and affording a flow area which varies in response to the supply pressure of the source, the device being so arranged that, as the pressure rises above a predetermined value, the first bridge is unbalanced in a sense that causes the actuating means (48, 49) to move the first bypass valve (42) in the opening direction; and
(b) a second auxiliary orifice device (61', 61a', 61b') associated with the command leg (51') of the second bridge and affording a flow area which varies in response to the pressure of the fluid supplied to the second distributing valve means (38'), this device being so arranged that, as the pressure rises above a value lower than said predetermined value, the second bridge is unbalanced in a sense that causes the second actuating means (48', 49') to move the second bypass valve (42') in the opening direction.

References Cited
UNITED STATES PATENTS

| | | | |
|---|---|---|---|
| 2,617,257 | 11/1952 | Douglas | 60—52 |
| 2,682,748 | 7/1954 | Ernst | 60—52 |
| 2,892,311 | 6/1959 | Van Gerpen | 60—52 |
| 2,892,312 | 6/1959 | Allen et al. | 60—52 |
| 3,300,969 | 1/1967 | Barden | 60—52 |
| 3,333,415 | 8/1967 | Adams | 60—52 |

EDGAR W. GEOGHEGAN, *Primary Examiner.*